United States Patent [19]
Lewis et al.

[11] Patent Number: 4,715,045
[45] Date of Patent: Dec. 22, 1987

[54] SYSTEM PROTOCOL FOR COMPOSITE SHIFT KEYING COMMUNICATION SYSTEM

[75] Inventors: Kenneth A. Lewis, Ridgefield, Conn.; Alan N. Alpern, Manhattan, N.Y.; Andrew C. Frank; Stuart E. Ross, both of Danbury, Conn.

[73] Assignee: GridComm, Inc., Danbury, Conn.

[21] Appl. No.: 840,497

[22] Filed: Mar. 17, 1986

Related U.S. Application Data

[63] Continuation-in-part of Ser. No. 650,777, Sep. 13, 1984, Pat. No. 4,577,333.

[51] Int. Cl.$^4$ .................... H04B 15/00; H04L 27/10; H04J 3/16
[52] U.S. Cl. ...................... 375/58; 375/48; 375/91; 375/104; 370/82; 329/112; 332/22
[58] Field of Search ............ 375/7, 8, 58, 45, 48, 375/51, 62, 66, 88, 89, 91, 104; 370/69.1, 124, 82, 83; 455/62; 371/28, 32; 332/21, 22, 23 R; 329/112, 135, 136

[56] References Cited

U.S. PATENT DOCUMENTS 4,197,500  4/1980  Klein et al. ............................ 455/62
4,577,333  3/1986  Lewis et al. ........................... 375/45

FOREIGN PATENT DOCUMENTS 59-23940  2/1984  Japan ...................................... 370/82

OTHER PUBLICATIONS

*Computer Networks* by A. Tanenbaum, 1981, Prentice-Hall, pp. 133, 143–155, 162–165, 174–177.
Sippl, *Data Communications Dictionary*, 1976, Van Norstrand Reinhold Company, pp. 1 and 318.

*Primary Examiner*—Robert L. Griffin
*Assistant Examiner*—Andrew J. Telesz, Jr.
*Attorney, Agent, or Firm*—Scully, Scott, Murphy and Presser

[57] ABSTRACT

A system protocol for the composite shift key communication of binary signals in which a transmitting transceiver transmits a first summed signal having a first qualifying signal at a qualifying signal frequency Wqt as one of the summed signal components only when a binary signal is desired to be transmitted. The transmitting transceiver ceases transmission of the first qualifying signal Wqt as a transmitted signal or as a component of a composite summed signal when neither a binary zero nor a binary one is desired to be transmitted. The receiving transceiver signals to the transmitting transceiver when the binary signal transmission is being successfully received by transmitting thereto a second qualifying signal Wqr. The receiving transceiver drops the transmission of the second qualifying signal Wqr when the binary signal transmission is not being successfully received, or is being received with perceived errors therein. The transmitting transceiver expects to receive the second qualifying signal Wqr during a successful binary signal transmission, and maintains its transmission of binary signals only when Wqr is received, indicating a successful binary signal transmission, and drops and restarts its transmission of binary signals in response to the transmission of Wqr being dropped by the receiving transceiver, indicating an unsuccessful binary signal transmission.

Details are also disclosed of many additional aspects of a protocol communication system including transmission in data packets, timing of the length of data packets as indicated by a subfield therein, a complementary binary test, a CHECKSUM subfield, a SEQUENCE subfield, a CHANNEL subfield, a TARGET subfield, a SENDER subfield, a LINK/CALL subfield, a SWAP subfield, an ORIGINAL TRANSMITTER subfield, an adaptive data packet length function, and a function which utilizes error information stored in memory in the selection of an available best communication channel.

31 Claims, 27 Drawing Figures

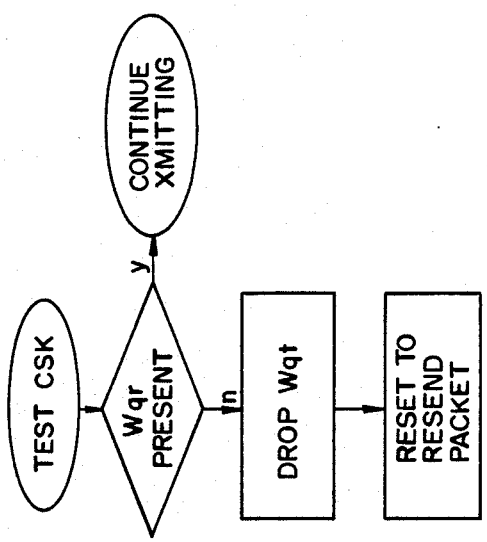
FIG.6 (TRANSMITTER)
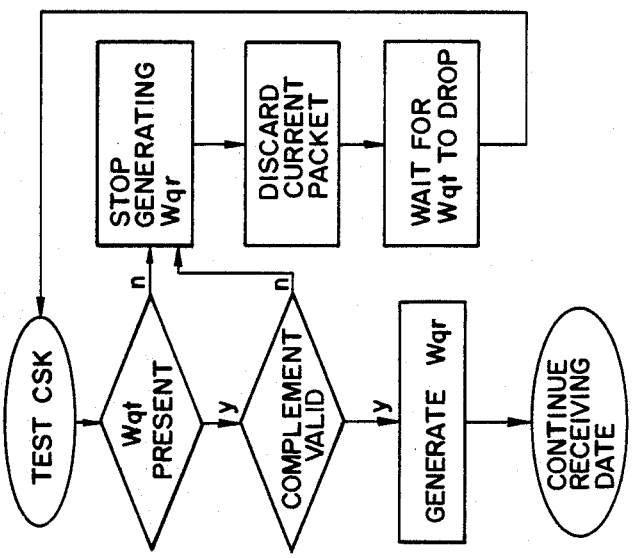
FIG.5 (RECEIVER)

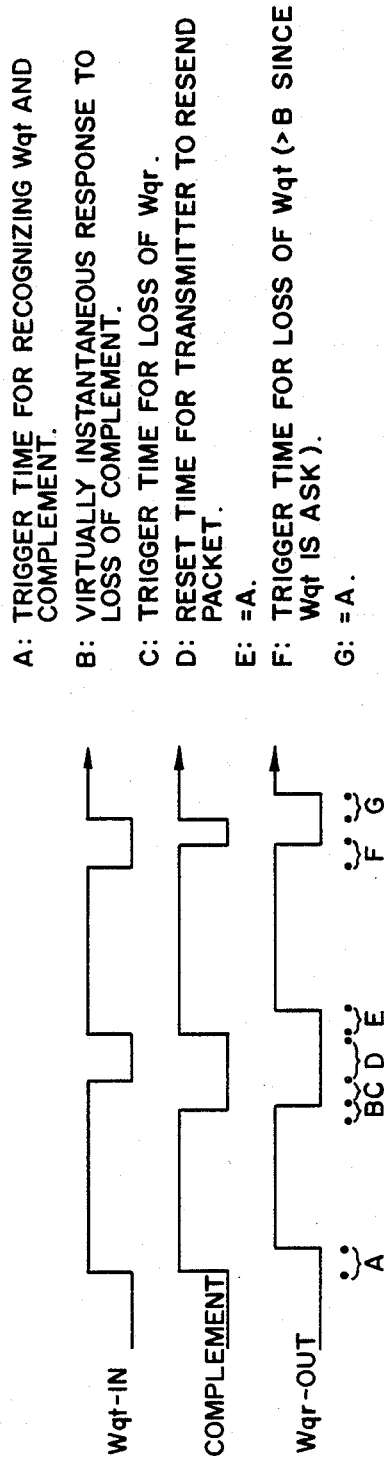
FIG. 7 (TIMING CHART-RECEIVER RESPONSE TO TWO TYPES OF CSK ERRORS)

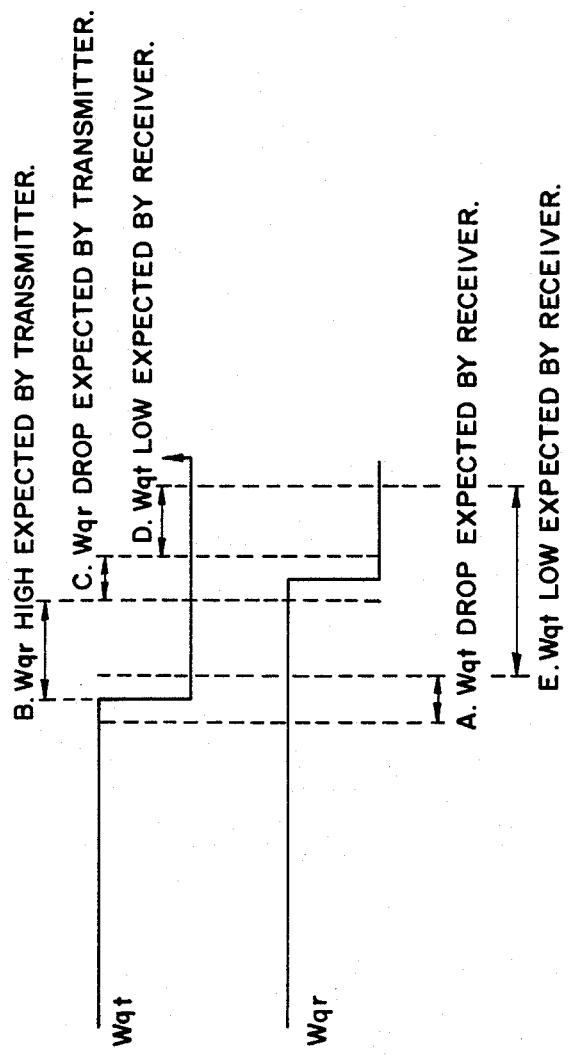
FIG.8 (ACKNOWLEGE PERIOD TIMING)

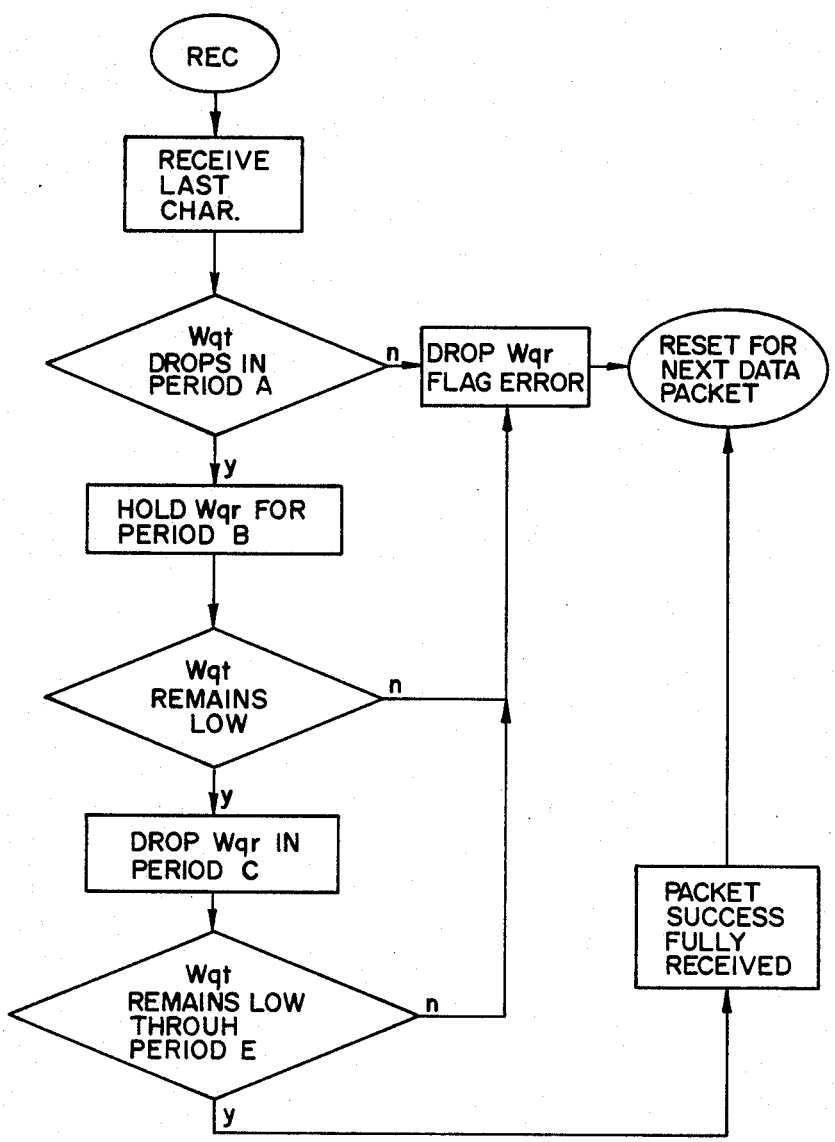
FIG.9 (RECEIVER DURING ACKNOWLEDGE PERIOD)

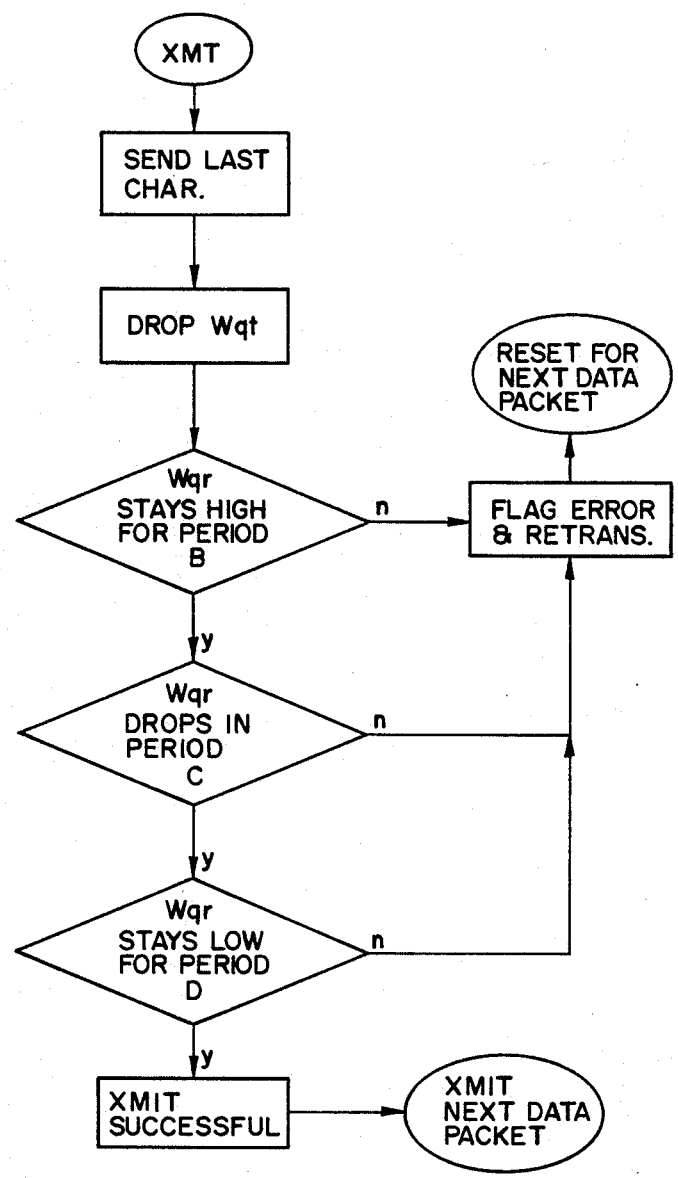
FIG.10 (TRANSMITTER DURING ACKNOWLEDGE PERIOD)

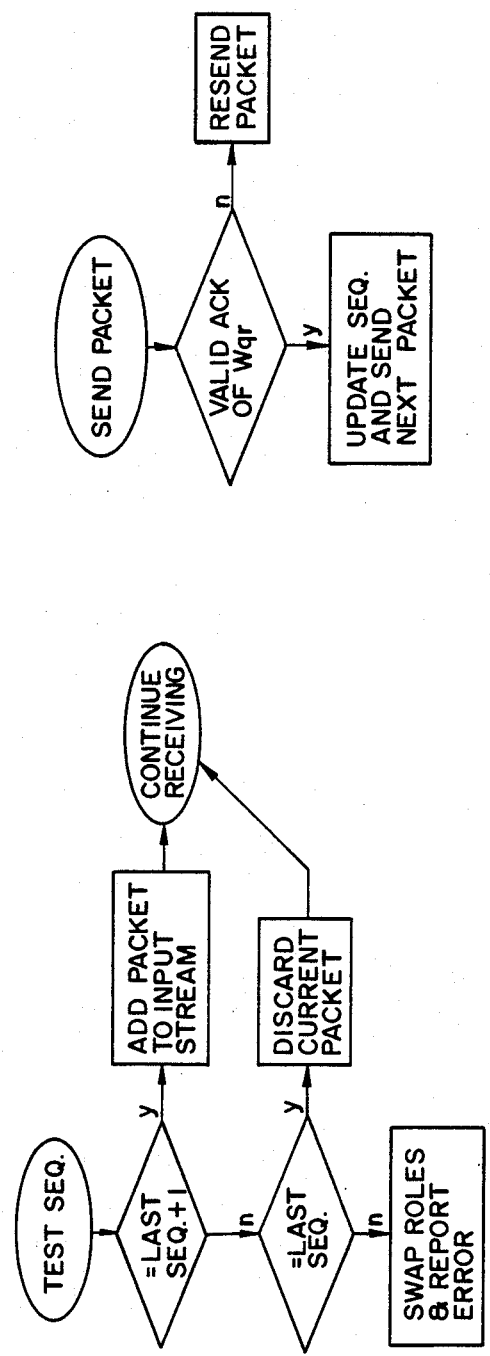

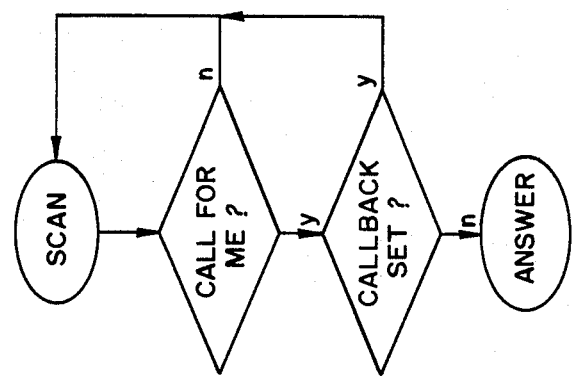
FIG.21 (CALLBACK-SCAN)
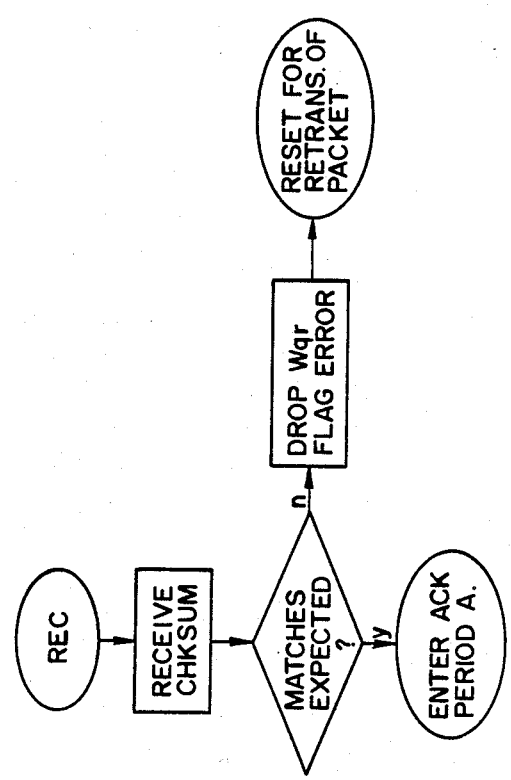
FIG.13 (RECEIVER RESPONSE TO CHKSUM)

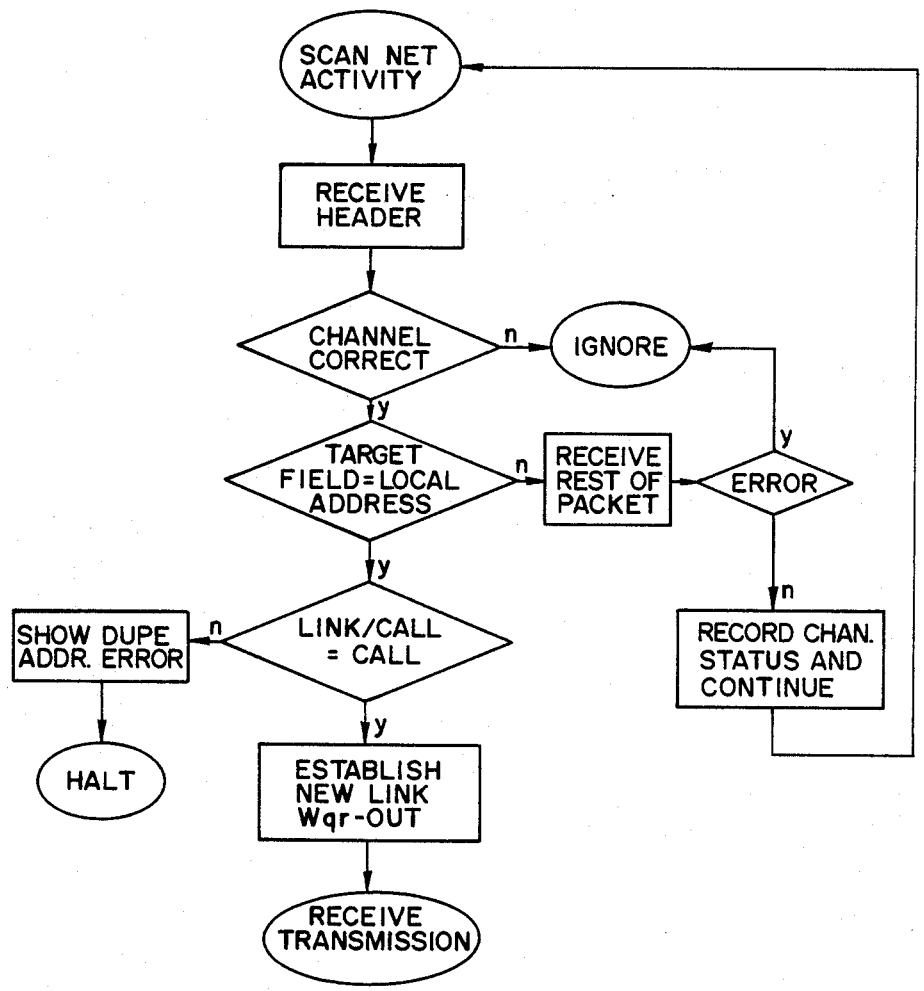
FIG.14 (RECEIVER RESPONSE TO CHANNEL & LINK/CALL)

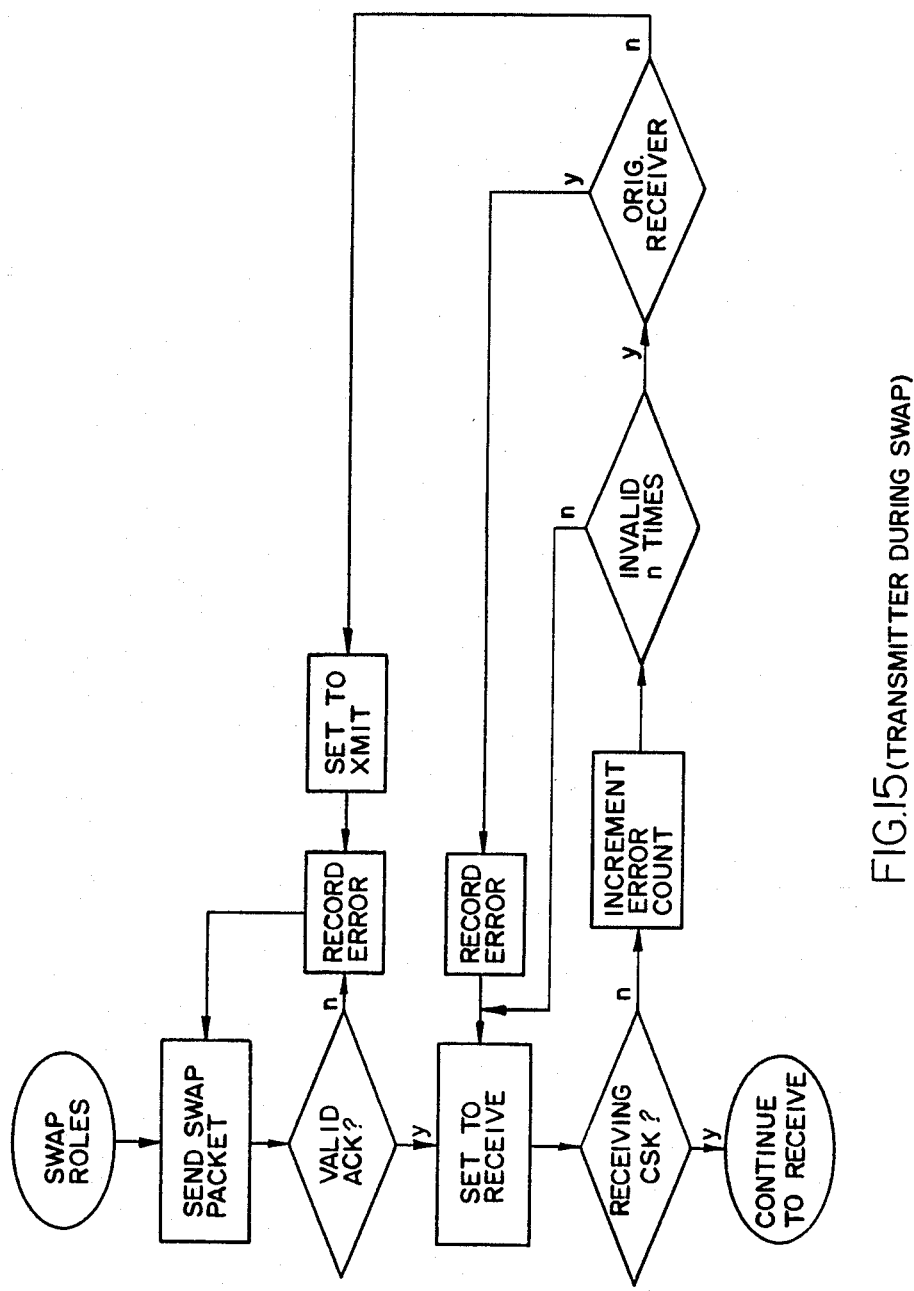
FIG.15 (TRANSMITTER DURING SWAP)

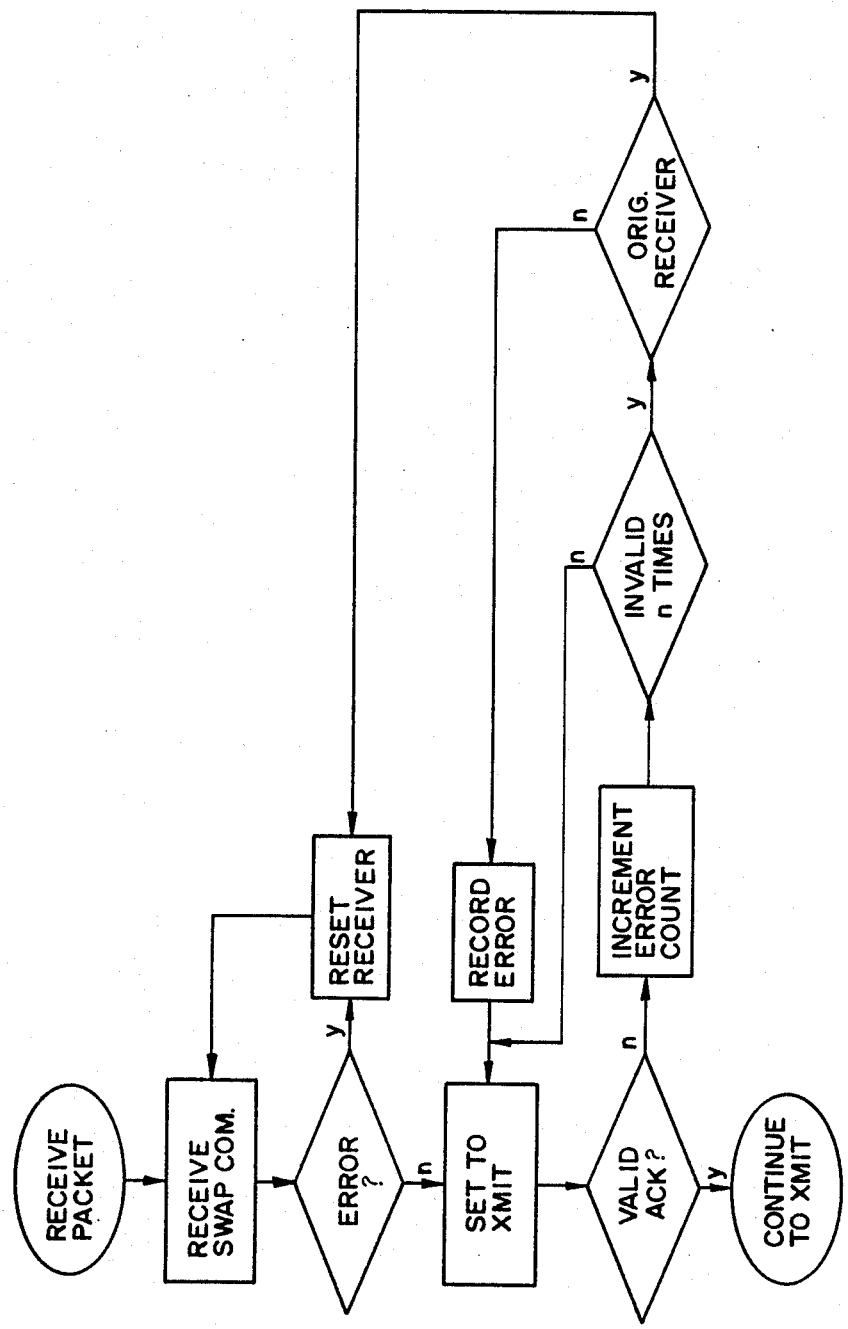
FIG. 16 (RECEIVER DURING SWAP)

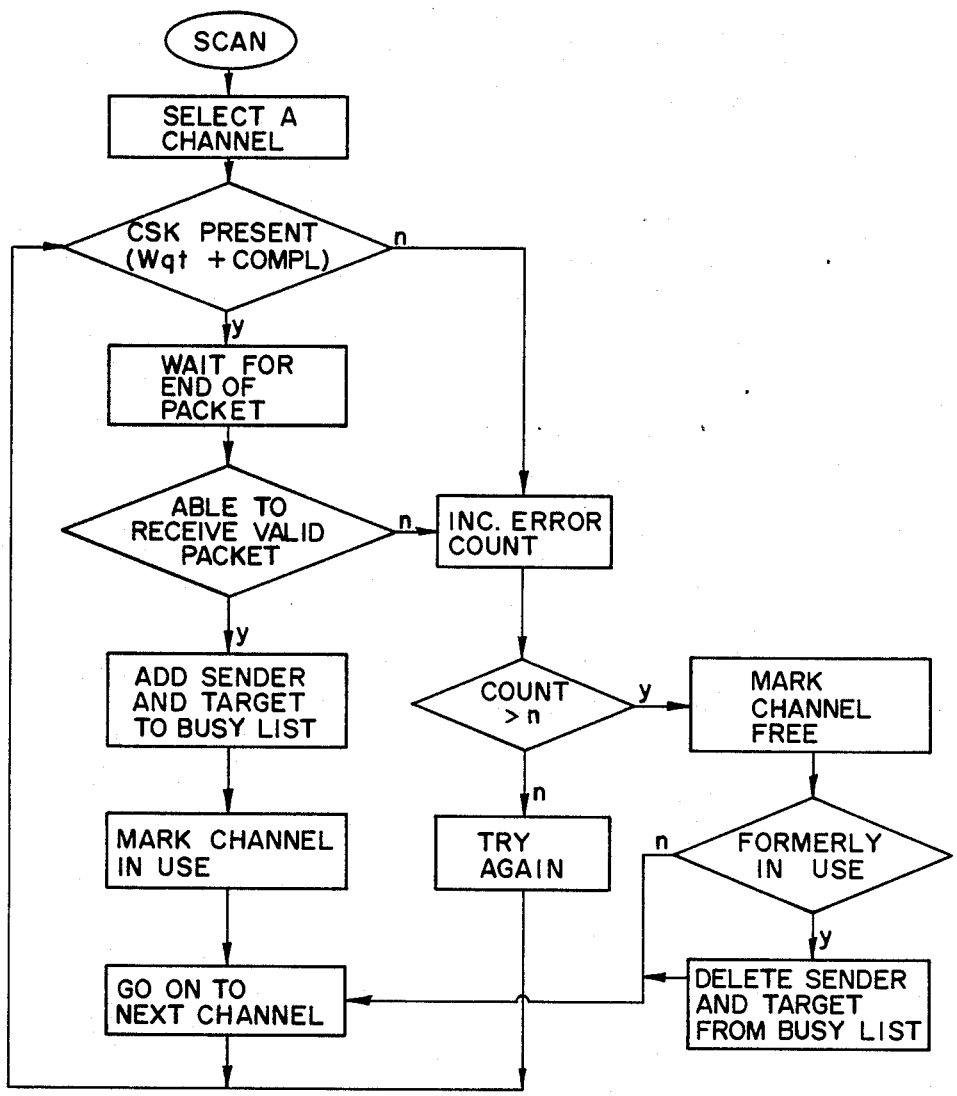
FIG.17 (SCANNING FUNCTION)

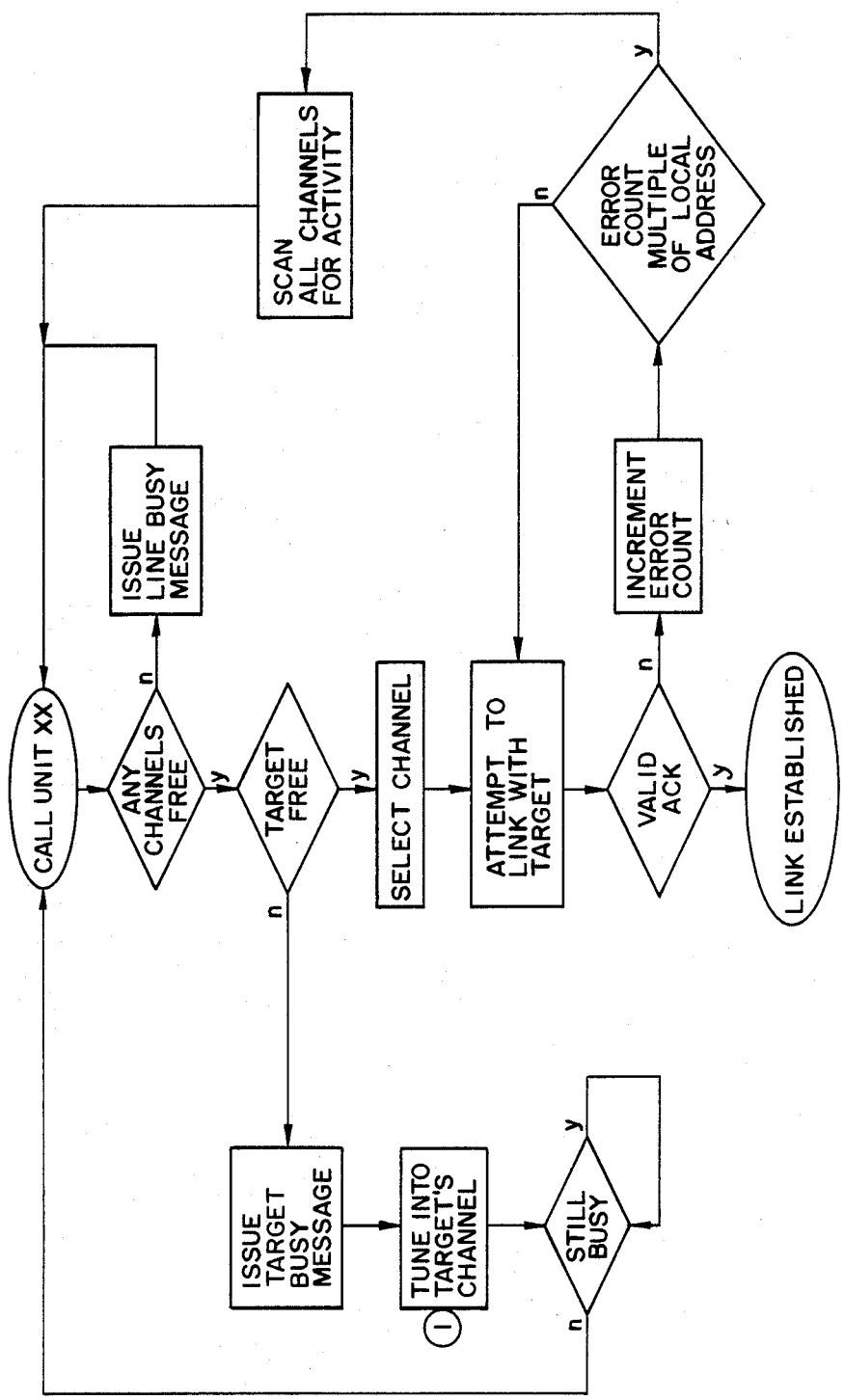
FIG. 18 (SCANNING INFORMATION USED WHEN TRANSMISSION REQUESTED)

(TRANSMITTER DURING UNLINK)

(RECEIVER DURING UNLINK)

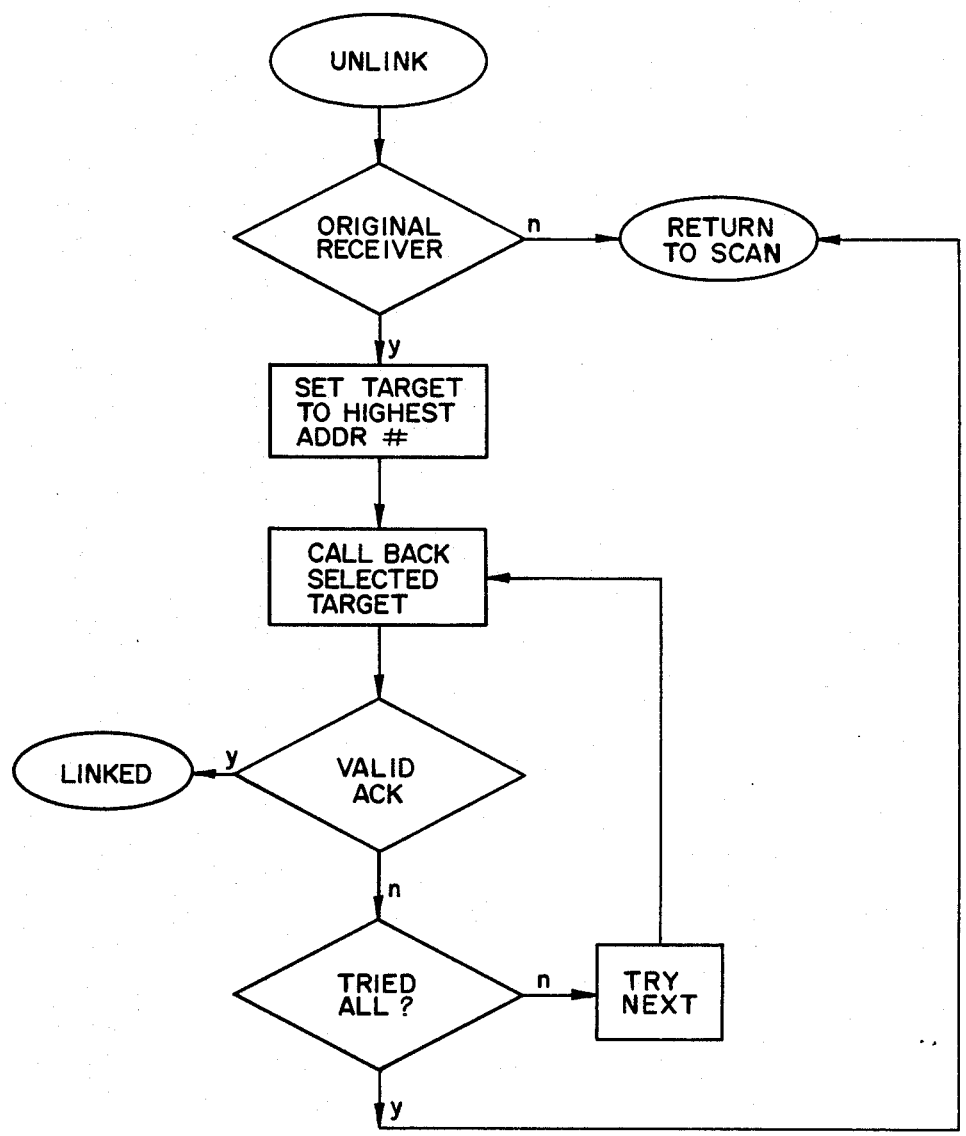
FIG. 22 (CALL BACK BY ORIGINAL RECEIVER)

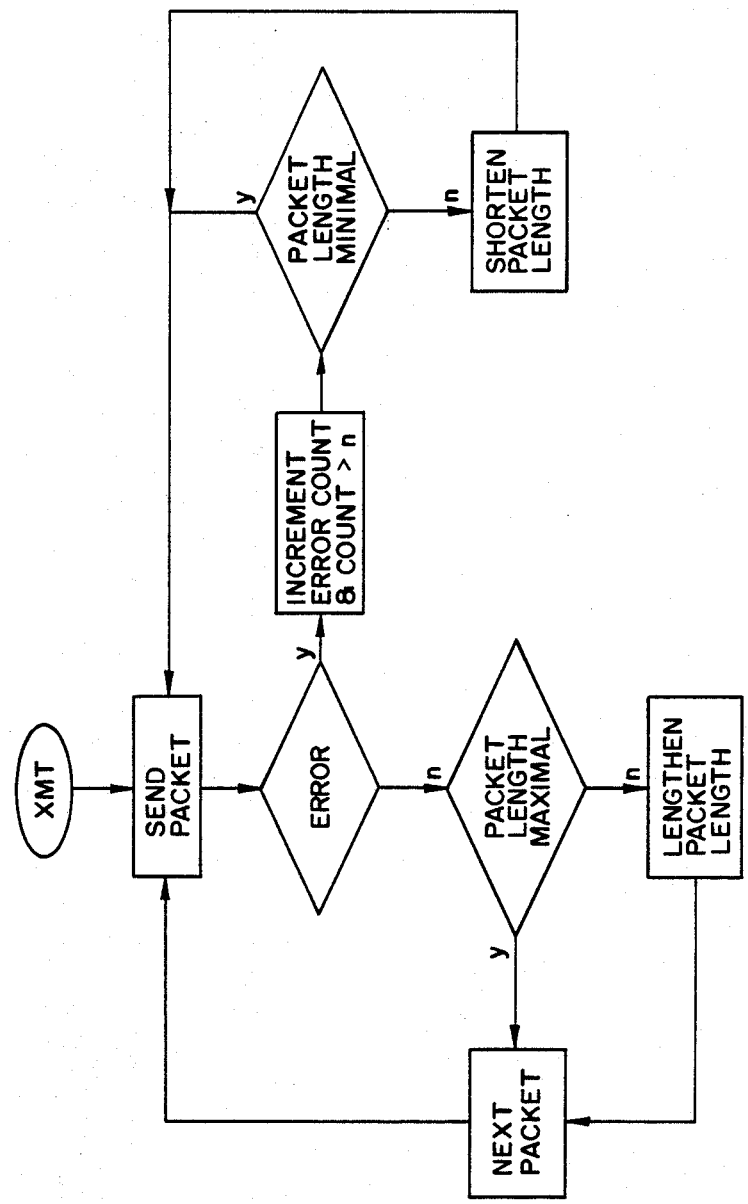
FIG. 23 (ADAPTIVE DATA PACKET LENGTH)

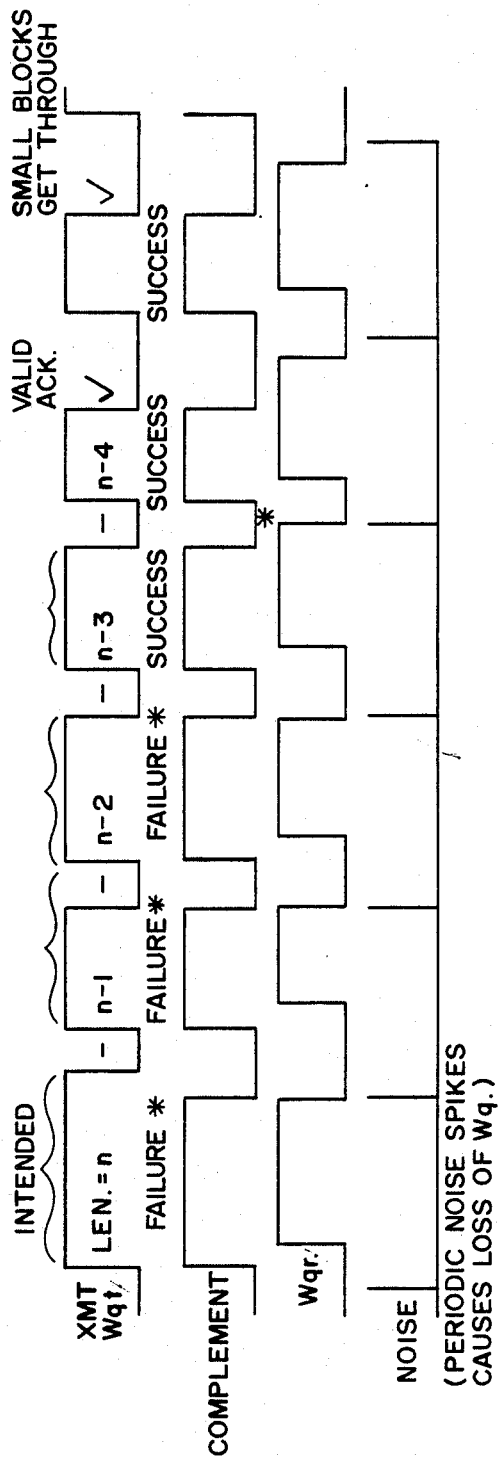
FIG. 24 (ADAPTIVE PACKET LENGTH EXAMPLE)

```
QUAL-TARGET 1,CHANNEL 1=0110
QUAL-TARGET 1,CHANNEL 2=0010

QUAL-TARGET 1,CHANNEL n=1000

QUAL-TARGET n,CHANNEL n=0010
```

FIG. 26 (UNIT MEMORY)

SYSTEM PROTOCOL FOR COMPOSITE SHIFT KEYING COMMUNICATION SYSTEM

This patent application is a continuation-in-part of application Ser. No. 650,777, filed Sept. 13, 1984, now U.S. Pat. No. 4,577,333.

BACKGROUND OF THE INVENTION

1. Field of the Invention

The present invention relates generally to a system and method for the communication of information in binary form, such as computer data, through a transmission medium such as existing AC power supply lines, or any other type of conductive waveguide. More specifically, the system protocol described herein was developed as a specific implementation of a Composite Shift Keying (CSK) communication system.

2. Discussion of the Prior Art

The prior art has generally recognized the need for communicating substantial amounts of information between remote locations in homes or office or industrial buildings, or even between such buildings. This information can be business records and data transmitted between computers, remote terminals, printers and the like, or can be used to control lighting, heating, air conditioning and other variable factors subject to control from a central location in the building.

In many commercial applications, the physical location of computers, such as personal computers and mini-computers, printers, word processors, and other peripheral equipment presents a major problem with respect to the networking of all of the involved components. Running hardwire to connect all of the components and stations is expensive, and also has the disadvantage of creating an immobile system, often in a dynamic office, plant or home environment.

Moreover, since power wiring already exists in many facilities which require local data transmission, reliable data transmission through this medium would produce significant cost savings in both material and the labor saved by not having to run additional cabling.

Techniques for using existing powerline wiring for communication purposes are described, for example, in the following U.S. Pat. Nos. 3,818,481; 3,876,984; 3,944,723; 3,964,048; 4,065,763; 4,106,071; 4,174,517; 4,217,646 and 4,222,035. Typically, the information to be communicated is modulated onto a carrier and the carrier is suitably applied to the electric power line. A receiver device is coupled to the electric power line network at each desired receiving location, and each receiver includes a decoder which typically demodulates the carrier to recover the communicated information. The information generally includes an address which identifies a receiver which is being communicated with, and also includes data information for controlling the remote devices that are coupled to the respective receivers. Filters have been employed to separate frequency of the carrier from the frequency of the electric power signal. Nevertheless, there is often a problem with an intermixture of the various signals on the power lines which may result in distortion of the information desired to be transmitted.

Experience in industrial environments has demonstrated the requirement for a method of digital data transmission which provides multiple redundant error detection without adversely affecting the transmission of data. Electromagnetic and radio frequency interference problems make reliable data transmission difficult with many existing data modulation techniques such as Amplitude Shift Keying (ASK) Frequency Shift Keying (FSK), Phase Shift Keying (PSK), and others.

BACKGROUND SUMMARY

An initial requirement in analyzing the function of a network system such as a CSK data communication system is to develop a model for categorizing different levels of the system. Work in standardizing this area of reference modeling has been ongoing for many years in such groups as the IEEE(Institute of Electrical and Electronics Engineers), the ECMA (European Computer Manufacturers Association) and the IOS (International Organization for Standardization). The background for this work comes primarily from a standard known as the OSI (Open Systems Interconnection) reference model. This model divides network function into seven distinct hierarchical levels as follows:

1. PHYSICAL LINK. This represents the physical medium which couples nodes on the network, such as coaxial cable, twisted pair wire, fiber-optic thread, or electrical power wiring, for example (the generic nature of CSK is inherently applicable to any physical medium capable of propagating waves, including, but not restricted to, coaxial or twisted pair cables, e.g. electrical power wiring, telephone lines, CATV lines, leased lines, as well as such diverse alternatives such as rail systems, plumbing systems, long, short, or microwave transmission systems, acoustical systems, optical systems, etc.).

2. DATA LINK. This represents the hardware support provided for low level data formatting and error detection (i.e. CRC (Cyclic Redundancy Check) on most systems, existence of a qualifying tone and the complementary test on the system of the subject invention).

3. NETWORK LAYER. This refers to the lowest level of microprocessor firmware (software in ROM (Read Only Memory)), which controls such functions as buffering data, establishing and terminating links on the network, and configuring the hardware as required.

4. TRANSPORT LAYER. This layer, also implemented in microprocessor firmware, deals with error detection and recovery, acknowledgement of successful transmissions, and the implementation of various network functions such as channel scanning, device call and response protocol, encryption, and compression and unpacking of data to increase throughput.

5. SESSION LAYER. This layer, still in firmware, deals with higher level issues such as device addressing, user (or host computer) I/O (input/output), and the opening and closing of connections (from the user's rather than the hardware's point of view). In the present system, this layer is responsible for interpreting instructions presented from a unit's host connection, network connection, or front panel switches, and driving the lower levels accordingly.

6. PRESENTATION LAYER. At this level, we move off of the transceiver unit, and into the host software domain. This level of host software formats and interprets data for the host, and can best be thought of as the contribution of the host's operating system and BIOS (Basic Input/Output System).

7 APPLICATION LAYER. This is the highest level of the application software, dealing with all aspects of the user interface.

SUMMARY OF THE INVENTION

Accordingly, it is a primary object of the present invention to provide an effective method of communicating binary information over a relatively noisy transmission medium, such as AC power lines, voice grade telephone lines or other cabling in environments containing severe electromagnetic or radio interference.

A further object of the subject invention is the provision of such a binary information communication system for the transfer of digital information in local area networks (LANs) in residential, office automation and manufacturing environments.

An additional object of the present invention is the provision of a binary information communication system which provides enhanced error detection capability with reduced protocol requirements, and increased useful data transmission capabilities. The present invention reduces transmission protocol because it intrinsicly provides for error detection, thereby reducing protocol complexity and overhead.

More detailed objects of the present invention are to provide a protocol standard for the utilization of CSK data transmissions such that:

1. transmitted data are received error-free, regardless of noise conditions, or are not received at all, such that the possibility of receiving erroneous data is extremely small;
2. the transmission media may be shared by several CSK transmitters, without corruption of data transmission due to signal leakage;
3. higher level network software or firmware can accomplish full duplex transmission of external data, and random addressing of implemented nodes, with full protection from all collisions;
4. waveguide utilization and operation are optimized under dynamic and unpredictable conditions such as varying noise conditions;
5. bit-level error detection is provided with an immediate response on the part of a transmitter to an error, resulting in improved data transmission speed during noisy periods;
6. synchronization and intended operation are maintained, even when total signal occlusion occurs between transmitter and receiver;
7. performance of common network functions are enabled utilizing an unconditioned or suboptimal waveguide, such as AC power transmission lines.

In accordance with the teachings herein, the present invention provides a Composite Shift Keying (CSK) communication system which combines aspects of both Amplitude Shift Keying (ASK) and Frequency Shift Keying(FSK) to enhance error detection for synchronous or asynchronous serial transmission of binary data in a noisy transmission medium. Orthogonal multiplexing may also be employed to double the number of discrete channels within a given bandwidth.

In summary, the present invention provides an arrangement and method for the composite shift key communication of binary signals in which a transmitting transceiver transmits a first summed signal having a first qualifying signal at a qualifying signal frequency Wqt as one of the summed signal components only when a binary signal is desired to be transmitted. The transmitting transceiver algebraically sums a first frequency signal W1 with the first qualifying signal Wqt to produce a first summed signal which is transmitted when a binary one is desired to be transmitted, and algebraically sums a second signal at a second frequency signal W0 with the qualifying signal Wqt to produce a second summed signal which is transmitted when a binary zero is desired to be transmitted. The transmitting transceiver ceases transmission of the first qualifying signal Wqt as a transmitted signal or as a component of a composite summed signal when neither a binary zero nor a binary one is desired to be transmitted. A receiving transceiver receives the transmitted signals, and identifies a binary one signal only when the qualifying signal Wqt and the first frequency signal W1 are received simultaneously as the first summed signal, and identifies a binary zero signal only when the qualifying signal Wqt and the second frequency signal W0 are received simultaneously as the second summed signal.

The receiving transceiver signals to the transmitting transceiver when the first qualifying signal Wqt is received simultaneously with the first frequency signal W1 as the first summed signal, or when the first qualifying signal Wqt is received simultaneously with the second frequency signal W0 as the second summed signal, that the binary signal transmission is being successfully received, by transmitting thereto a second qualifying signal Wqr. The receiving transceiver drops the transmission of the second qualifying signal Wqr when the first qualifying signal Wqt is not received simultaneously with the first frequency signal W1 as the first summed signal, or when the qualifying signal Wqt is not received simultaneously with the second frequency signal W0 as the second summed signal, to signal the first transceiver that the binary signal transmission is not being successfully received.

In a preferred exemplary embodiment, the transmission medium is over available AC power supply lines formed into a local area communications network, and the receiving transceiver tests the signals W1 and W0 for a complementary, exclusive OR relationship, and also drops transmission of the second qualifying signal Wqr when the signals W1 and W0 are not complementary signals, to signal to the transmitting transceiver that the binary signal transmission is not being successfully received.

In greater detail, the transmitting transceiver expects to receive the second qualifying signal Wqr during a successful binary signal transmission, and maintains its transmission of binary signals only when Wqr is received, indicating a successful binary signal transmission, and drops and restarts its transmission of binary signals in response to the transmission of Wqr being dropped by the receiving transceiver, indicating an unsuccessful binary signal transmission. The transmitting transceiver transmits the binary signals in data packets, and drops its transmission of the first qualifying signal Wqt after the transmission of a data packet, and the receiving transceiver drops its transmission of the second qualifying signal Wqr in response to the dropping of the first qualifying signal Wqt after transmission of a data packet. The transmitting transceiver transmits a data packet having a subfield at the beginning thereof indicating the expected length of the data packet, and the receiving transceiver times the dropping of the first qualifying signal Wqt after the transmission of a data packet to ensure that it is within an expected Wqt dropping interval as indicated by the subfield. If so, the receiving transceiver drops transmission of the second qualifying signal Wqr within an expected Wqr dropping interval, and the transmitting transceiver times the dropping of Wqr to ensure that it is within an expected Wqr dropping interval. The transmitting transceiver accepts the dropping of Wqr within the expected Wqr dropping interval as a signal that the data packet was successfully received by the second transceiver.

The transmitting transceiver also transmits a CHECKSUM signal at the end of a data packet, which indicates an expected sum of binary signals in the data packet, and the second transceiver compares the received CHECKSUM signal with the actual sum of binary signals received in the data packet. If the expected and actual sums of binary signals are equal, the receiving transceiver drops transmission of Wqr within the expected Wqr dropping interval as a signal to the first transceiver that the data packet was successfully received thereby. If not, the receiving transceiver drops transmission of Wqr outside the expected Wqr dropping interval to signal that the data packet was not successfully received.

The transmitting transceiver also transmits a data packet SEQUENCE subfield as part of the data packet, and it increments the SEQUENCE subfield in the next data packet after it has been signalled by the receiving transceiver that the previous data packet was successfully received. Alternatively, the transmitting transceiver retransmits the previous data packet with the same SEQUENCE subfield when it has not been signalled by the second transceiver that the previous data packet was successfully received.

Moreover, the transceivers are capable of transmitting and receiving signals over a plurality of different communication channels, each of which has a different frequency band allocation, which are also shared by additional similar transceivers. Each transmitting transceiver also transmits a data packet CHANNEL subfield as part of the data packet, and a receiving transceiver compares the received CHANNEL subfield with an expected and stored CHANNEL subfield for a match. A mismatch is taken as an indication that the data packet is for a different channel. The transmitting transceiver also transmits a data packet TARGET subfield and a SENDER subfield as part of the data packet. The receiving transceiver compares the received TARGET subfield with its own stored TARGET address for a match, and a mismatch is taken as an indication that the data packet is for a different TARGET address, while the received SENDER subfield is taken as the identity address of the transmitting transceiver.

The transmitting transceiver also transmits a data packet LINK/CALL subfield as part of the data packet as an indication that the transmitting transceiver is either linked in transmission or is calling to establish a communications link. If in that same data packet, the received TARGET subfield matches the stored TARGET address of the receiving transceiver, and the receiving transceiver has also determined from the LINK/CALL subfield that the transmitting transceiver is linked in transmission with another transceiver having the same TARGET subfield, then the receiving transceiver terminates its operation and indicates a duplicate address error.

A transmitting transceiver also transmits a data packet UNLINK subfield as part of the data packet, and a receiving transceiver accepts the received UNLINK subfield as a command from the transmitter to terminate the communications link therebetween. The transmitting transceiver also transmits a data packet SWAP subfield as part of the data packet, and the receiving transceiver accepts the received SWAP subfield as a command that, after transmission of that data packet, the transceivers are to exchange roles, with the receiving transceiver becoming the transmitter and the transmitting transceiver becoming the receiver during transmission of the next data packet. An additional data subfield is also transmitted as part of the data packet, and indicates which transceiver was the original transmitter and the original receiver, and the transceivers revert to their original roles after a given number of binary signal transmissions have been attempted unsuccessfully. This allows transceivers which might have become unsynchronized due to some error, to re-synchronize their operations.

Each transceiver, when not in an active transmission or receiving state, is normally in a scan mode in which it scans and receives information in each communication channel in active use, and records in memory the TARGET and SENDER addresses of the transceivers using each channel, thus determining and storing in memory the addresses of each TARGET and SENDER in active communication in each channel. The scan mode of a transceiver is characterized by the transceiver not transmitting a Wqr signal in response to a data packet.

One advantageous feature of the present invention is the provision of an adaptive data packet length, by which the transmitting transceiver decreases the length of successive data packets in response to previous data packet transmissions not being successfully received by the second transceiver. The concept is to make the data packets shorter to compensate for apparent high noise levels on the transmission medium, such that an adaptive packet length is utilized to cope with noise on the transmission medium. Moreover, the system also operates in a reverse manner in which the transmitting transceiver incrementally increases the length of successive data packets in response to the previous data packets being successfully received. Moreover, each transceiver is provided with a memory with a memory field having therein a maximum effective packet length for transmission, and a minimum packet length to enable transmission, and is programmed to start a transmission session with a second transceiver at the maximum effective packet length.

Another very advantageous feature of the present invention is that each transceiver records in memory information on every other transceiver and each communication channel on the adaptive data packet length of previous transmissions therein. When a transceiver is setting up a data transmission with another transceiver, it selects that available communication channel which the information in memory indicates has the longest adaptive data packet length, thereby indicating it is the best channel over which to communicate.

The composite shift keying modulation approach of the present invention copes well with the problems associated with a power line, which generally represents a hostile communication medium at any frequency. On a power line, it is not a question of how to avoid transmission corruption due to noise, but how to deal with its certain eventuality. The present invention addresses this area by maximizing noise immunity, and also by allowing the instantaneous detection of noise corruption of transmitted binary data.

The data communication system of the present invention should also function well in a multichannel distributed environment where computers are wired together. Moreover, the present invention should find significant applications in many relatively small businesses having a 1,000 to 50,000 square foot office facility of personal computer and peripheral networks. Distributed techniques are also used in a multitude of manufacturing processes, mining operations, and robotics where the present invention should find application, thereby substantially reducing the need for hardwiring connections and providing for more complete system flexibility.

The data communication system of the present invention should also find utility in applications wherein audio information can share the AC power lines with the transmitted data, giving the power lines new dimensions for office music, intercoms and security applications. The present invention should be able to provide a reasonable level of music fidelity and excellent voice resolution over suitable speaker systems, which can be merely plugged into receptacles in the power system.

BRIEF DESCRIPTION OF THE DRAWINGS

The foregoing objects and advantages of the present invention for a composite shift keying communication system may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 5 illustrates a logic flow diagram for a basic CSK receiver, showing testing for the presence of Wqt and a complementary relationship, and the generation of a Wqr response;

FIG. 6 illustrates a logic flow diagram for a basic CSK transmitter, showing its response to Wqr;

FIG. 7 depicts several exemplary waveforms, illustrating various responses to the presence and loss of Wqt, a complementary relationship, and Wqr;

FIG. 8 illustrates the timing periods and responses of both a transmitter and a receiver during an Acknowledge timing period at the end of the transmission of a data packet;

FIGS. 9 and 10 are logic flow diagrams respectively for a receiver and a transmitter, indicating their functions during the Acknowledge timing period;

FIGS. 11 and 12 are logic flow diagrams respectively for a receiver, and a transmitter for the SEQUENCE subfield of the HEADER field portion of a data packet;

FIG. 13 illustrates a logic flow diagram of the response of a receiver to the CHECKSUM subfield portion of a data packet;

FIG. 14 is a logic flow diagram of the response of a receiver to the CHANNEL, TARGET address and LINK/CALL subfields of the HEADER field portion of a data packet;

FIGS. 15 and 16 are logic flow diagrams respectively for a transmitter and receiver, relative to which a SWAP subfield command has been included in the HEADER field portion of a data packet, and indicates the actions to be taken when mistakes in transmission have resulted therefrom;

FIG. 17 is a logic flow diagram of a scanning function and state of a CSK transceiver;

FIG. 18 is a logic flow diagram illustrating how the information acquired during scanning is used when a CSK transceiver is attempting to enter a transmission state;

FIGS. 21 and 22 are logic flow diagrams for CALL-BACK command subfields of the HEADER field portion of a data packet;

FIG. 23 is a logic flow diagram illustrating the adaptive data packet length functions of a CSK transmitter, whereby the length of the data packet is adjusted to adapt to noise conditions existing on the physical communications link;

FIG. 24 illustrates exemplary waveforms showing the functions of the adaptive data packet length;

FIG. 26 illustrates an exemplary QUAL memory field maintained by a transceiver.

DETAILED DESCRIPTION OF THE DRAWINGS

Figure 1:
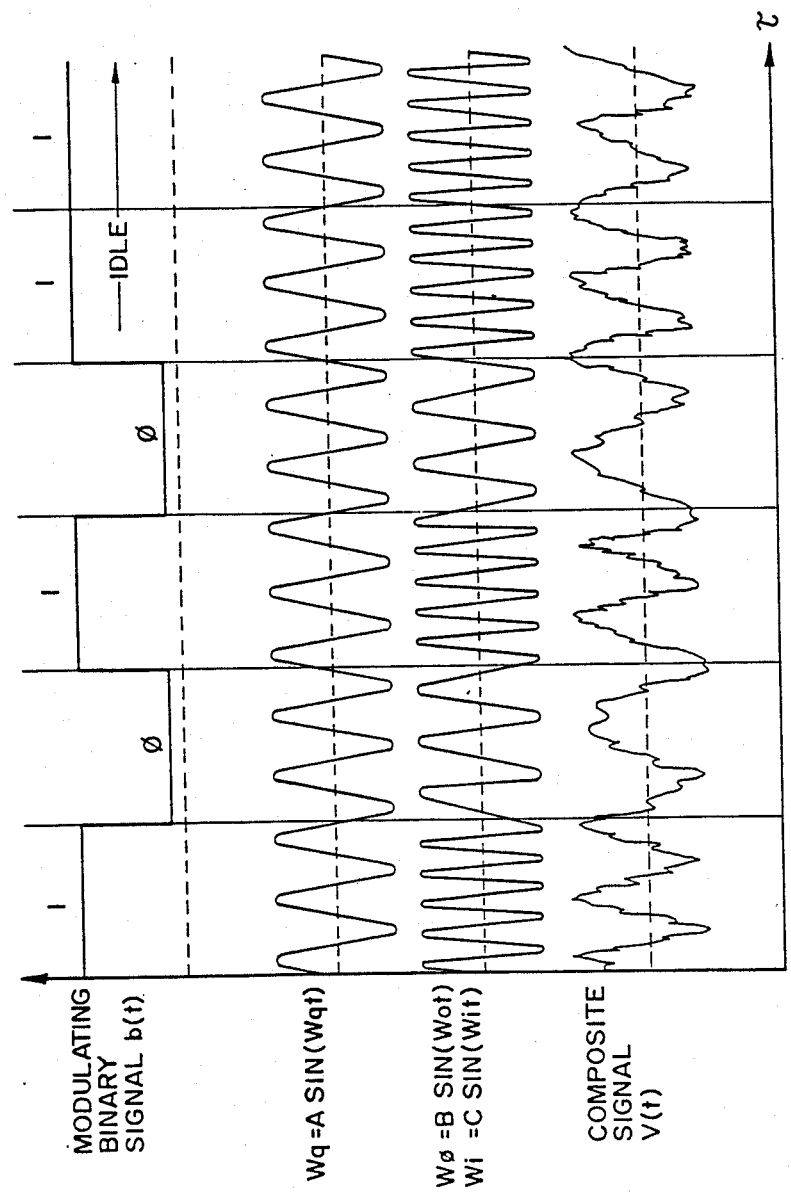
FIG. 1 illustrates several waveforms which are helpful in explaining the principles of operation of the present invention.
Figure 2:
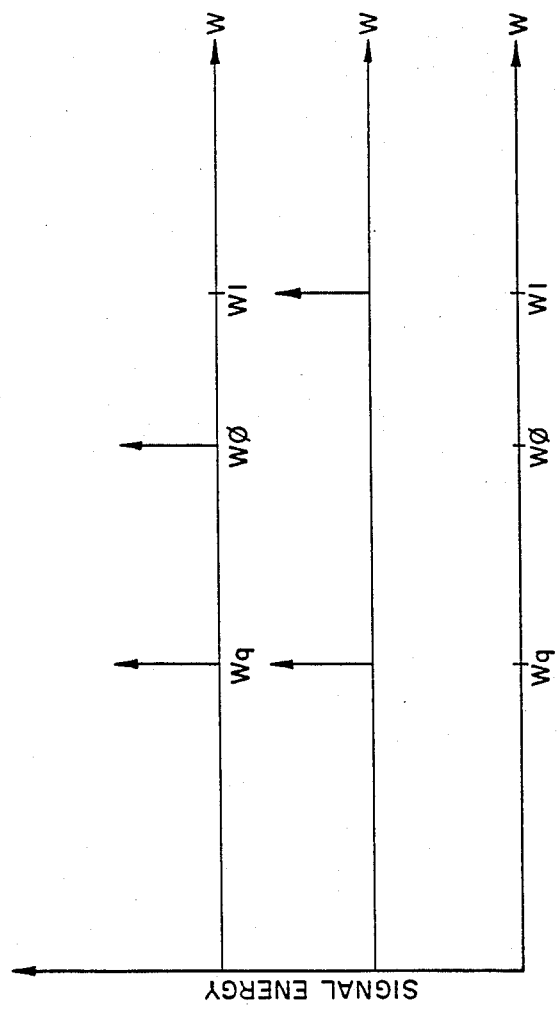
FIG. 2 illustrates a frequency domain explanation of the principles of operation of the subject invention.

Referring to the drawings in detail, FIG. 1 illustrates an exemplary modulating binary signal b(t) to be transmitted and consisting of data bits 0101, followed by an idle period. Pursuant to the teachings of the present invention, the qualifying frequency Wqt is generated during the binary signal 0101, but not during the idle period. A first frequency signal W1 is generated during the presence of a binary 1, while a second frequency signal W0 is generated during the presence of a binary 0. The composite transmitted signal v(t) is the added or combined sum of Wqt and W1 and Wqt and W0. FIG. 2 is a self-explanatory frequency domain illustration of the principles of operation illustrated in FIG. 1.

Figure 3:
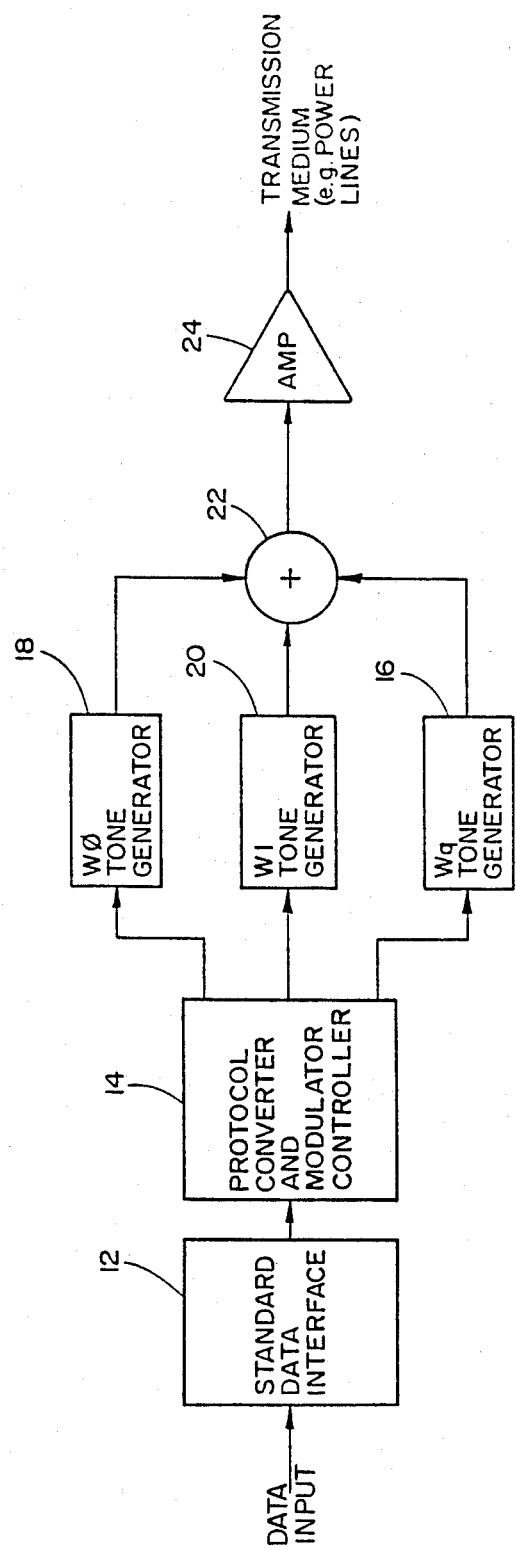
FIG. 3 is an exemplary embodiment of a composite shift key modulator associated with a data transmitter pursuant to the present invention.

FIG. 3 illustrates an exemplary embodiment of a composite shift key modulator associated with a data transmitter pursuant to the present invention. Referring thereto, digital data to be transmitted is initially directed to a standard data interface 12, which could be any of several standard data interfaces known in the industry such as EIA RS-232C, RS-422, RS-423, IEEE-488, or a Centronics parallel printer interface, each of which specifies electrical and mechanical requirements for the interconnection and a protocol for communications. The protocol required for CSK data transmission differs from the protocols used by these standard interfaces, and accordingly a protocol converter and modulator controller 14 converts the standard protocol from the data interface to the CSK protocol.

In essence, the protocol converter utilizes the protocol to receive the binary information, which it retains, but then discards the received protocol, and utilizes a selected CSK protocol with the received data. The implementation of an additional signal, a handshaking tone Wqr produced by the receiving unit, further enforces the CSK protocol. The approach of the present invention may be considered to be block asynchronous, with synchronous data within each block, which already achieves some data reduction if a standard asynchronous protocol such as RS-232C is utilized since the start, stop and parity bits may be removed from each byte within the data stream before transmission, as it applies to block protocol.

The modulator controller 14 modulates the transmitted data in accordance with the principles of operation illustrated in FIGS. 1 and 2. In a preferred embodiment, the protocol converter and modulator controller 14 can be implemented with a mask programmable single IC microcomputer unit (MCU). This design allows any desired standard data interface to be accommodated with minimal changes to the circuitry.

The modulator controller 14 selectively modulates a Wqt tone generator 16, a W0 tone generator 18, and a W1 tone generator 20, each of which generates a single frequency tone at the respective frequencies Wqt, Wqr, W0 and W1 when activated by the protocol converter and modulator controller 14, and no signal when deactivated. In one advantageous and preferred embodiment, the single tones are generated digitally by recall from a ROM memory, and put through a D/A converter. Essentially, the protocol converter and modulator controller 14 controls the activation of the appropriate tone generators to produce the CSK signals required to transfer the data. The tone generators 16, 18 and 20 can also be implemented as gated oscillators, although many alternative techniques can be utilized to produce the same results.

The particular frequencies of Wqt, Wqr, W0 and W1 are not critical to the present invention. However, in a power line communication system, W0 and W1 would generally be separated by less than 20 KHz, and Wqt and/or Wqr would generally be separated from W0 and W1 by at least 20 KHz. Normally, W0 and W1 would be selected to be higher frequencies than Wqt since W0 and W1 essentially transmit data, and according to data communication theory, higher frequencies allow data to be transmitted at faster rates. As an example only, Wqt, Wqr, W0 and W1 can be selected to be in a low frequency radio wave bandwidth between 50 KHz and 490 KHz. Of course, FCC regulations on available frequencies and bandwidths must also be considered and complied with. In communication systems over other communication mediums, the particular frequencies of Wqt, Wqr, W0 and W1 and the particular bandwidth, would depend upon the parameters of the communication system implementation.

The outputs from the tone generators 16, 18 and 20 are summed at 22 to produce the final CSK signal, which is then amplified by a power amplifier 24 and applied to a transmission medium such as a power line. In the case of a power line medium, an interface stage also could be utilized to couple the amplified CSK signal to and isolate the transmitter from the power line. The amplified output can be dynamically impedance matched to the power line so that as the power line impedance swings, the CSK Signal Voltage remains the same. RF transmitters should be able to cope with line impedances of 1 to 50 ohms with such a dynamic impedance matching technique. The transmitter essentially sees the AC power line as a low impedance, inductive source of infinite length for a carrier in the 50 to 490 KHz bandwidth. Ultra high impedance terminations (i.e. transformers) can be utilized to enhance communication capabilities because there is no need to deal with RF reflection. Simple transformer communication bridges can also be utilized to provide for multiple power system coupling.

Figure 4:
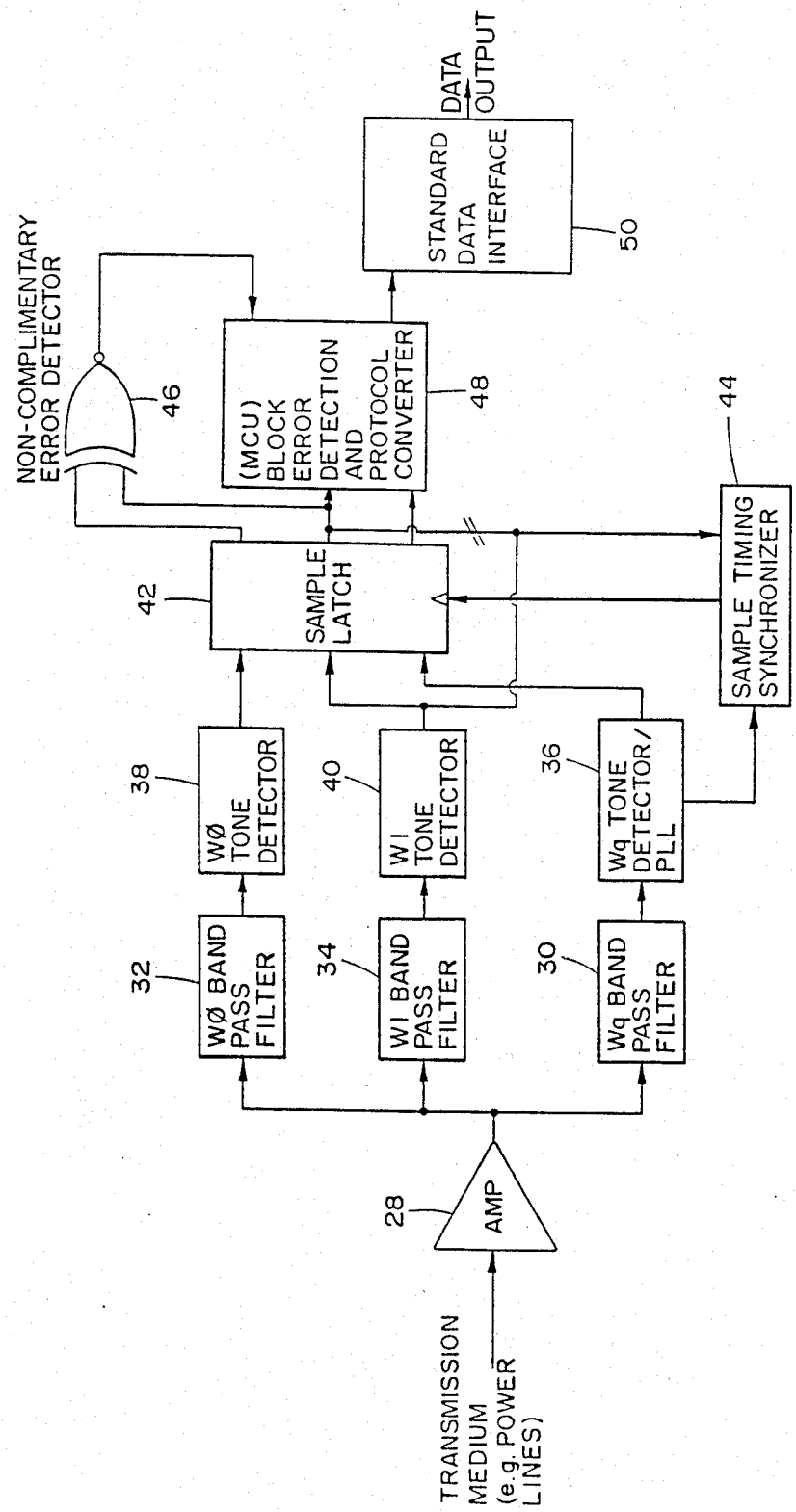
FIG. 4 is an exemplary embodiment of a composite shift key demodulator associated with a data receiver pursuant to the subject invention.

FIG. 4 illustrates an exemplary embodiment of a composite shift key demodulator associated with a data receiver pursuant to the present invention. The signals from the transmission medium are amplified by a preamplifier 28 (which may incorporate therein automatic gain control circuits) to increase the signal level to a more easily detectable level since the transmission medium normally attenuates the signal to a certain extent.

The preamplifier output is applied to three bandpass filters 30, 32, and 34 centered respectively at Wqt, W0 and W1, which reduce the amplitude of extraneous signals delivered to the three tone detectors 36, 38 and 40 for detection of the tones at frequencies Wqt, W0 and W1. The tone detectors indicate the existence or nonexistence of the particular single frequency tone to which they are tuned, and determine the present state of the CSK signal, i.e. which of the three CSK tones are being transmitted.

In order to decode the CSK data stream, which is latched or stored in a Sample Latch 42, the tone decoders must be sampled at the bit transmission rate. This function is performed by a Sample Timing Synchronizer 44. In one advantageous embodiment, Wqt is selected to be related to the bit rate so that it may be used by the receiver as a reference for maintaining phase lock with the transmitter clock. Data synchronization can be established by a short clock run-in at the beginning of a data block (or by start-stop bit techniques if block protocol is not used). As an example, the clock run-in could be simply a transmission of 10101010, which is used by the synchronizer to determine the proper initial sample time, and then Wqt is used to maintain this synchronization for the remainder of the data block.

The W0 and W1 outputs of the sample latch 42 are checked by an exclusive OR gate 46 with a not output (NOR gate) to determine that W0 and W1 are complements. With proper sampling synchronization, it can be assumed that a non-complementary relationship between W0 and W1 indicates that a noise induced error has occurred. Data can also be transmitted at a fixed rate and in known length data packets, the length of which can vary, so that the time interval through which Wqt is active is fixed and known. Therefore, if Wqt becomes inactive before this known time interval has elapsed, an error has occurred. A checksum or cyclic redundance check error detection scheme may also be employed. A parity scheme can also be employed at the character level. Transmission of known length data blocks also allows the use of error correction algorithms and data compression techniques.

In a preferred embodiment, the block error detection and protocol conversion are performed by a microcomputer unit (MCU) 48. MCU 48 checks for the existence of Wqt at the Wqt sample latch, checks if exclusive NOR gate 46 indicates an error, and accumulates the data stream from the sample latch 42. If a block transmission protocol is employed, MCU 48 also verifies the data stream using a checksum or similar technique. If no errors are indicated, the MCU 48 outputs the data with an appropriate protocol through a standard data interface 50 such as an RS-232C, RS-422, etc.

If block transmission protocol is not utilized, the data can be transmitted asynchronously with Start of Message and End of Message (SOM/EOM) detectors. Detection of an appropriate ASCII character would enable the transmitter output, while detection of no ASCII character would disable the transmitter output.

When the demodulator is part of a transceiver, the MCU 48 can request a selective block retransmit when an error condition is detected. The length of the selected block can be as small as one byte, or as long as desired, depending upon the particular environment and implementation.

It is expected that the principles of the present invention should allow a Local Area Network (LAN) to be implemented at reasonable data speeds up to 9600 bits per second and higher, with very low bit error rates, comparing favorably with equivalent hardwired LAN's. An entire user-friendly system could transmit data, whether in a point to point application or in a local area network, and systems with half or full duplexed channels should be easily implementable and installable.

FIGS. 5 through 26 provide an exemplary, preferred embodiment of a system protocol for the transmission of CSK encoded digital data. The system protocol is designed to provide assurance of accuracy of data reception, even in noisy environments, such as over AC power lines, while increasing data throughput speed by ensuring an instantaneous response to the detection of erroneous data.

A typical data transmission system might involve computer peripherals containing a transmitter, a receiver, a UART (Universal Asynchronous Receiver/Transmitter: a device which facilitates standard serial communication with a host device, such as a computer or printer), an optional small console (consisting of a display and associated switches), and hardware to permit the devices to be coupled to the electrical power wiring.

CSK ERROR DETECTION

The system protocol provides a unique ability to cope with noise inherent in a local medium, resulting in a completely error-free transmission/reception capability. Three tests are utilized to make this possible.

The first test, on the part of both receiver and transmitter, is for the existence of a qualifying tone, with a receiver testing for a transmitter qualifying tone Wqt and transmitter testing for a receiver qualifying tone Wqr. The absence of a qualifying tone for a significant period of time causes the transmission of the current block or packet of data to be immediately interrupted and started again. A receiver responds to the loss of the transmitter's qualifying tone Wqt by dropping its own qualifying tone Wqr. The transmitter responds to the loss of Wqr by dropping Wqt for a period of time, and then initiating a retransmission of the data packet which was interrupted. A block count ensures that the receiver does not interpret retransmits as repetitions of the same block, in the relatively rare event that an error occurs at the very end of a block.

A second test involves the complementary nature of tones representing the bit values one and zero. The present system protocol proceeds with the realization that with a CSK communication system, while the odds of a noise burst interrupting the data stream at any point in time may be fairly high in certain environments, the odds that this noise burst will occur in one specific frequency band, without affecting the other related frequency band are small when the frequency bands are implemented close to one another. In the event both (or, far less likely, neither of the) frequencies is present, the CSK hardware flags an error signal that indicates that invalid data has been detected, and that the data block or packet must be retransmitted. The complementary test eliminates the need for various levels of redundancy and complex testing that add considerable overhead to existing protocol systems, and make them inviable for use in a high speed, noisy system, such as electrical power wiring.

A third test, which is of a more conventional nature, is a checksum test. This test is a well established method of verifying the error free nature of a transmitted data block after it has been received. Its inclusion in a CSK system ensures that, even if noise conditions are such that the value of a bit somehow becomes reversed, the data would not be validated. Moreover, as a practical matter, the checksum test adds stability to the system, in the unlikely event that a receiver and transmitter somehow get out of sync with one another, and must resynchronize.

NETWORK LEVEL UTILIZATION OF CSK

On the network level, there are two significant primary states a node can be in, a receiving state, and a transmitting state. A third scanning state also exists, and is discussed in further detail hereinbelow. In the receiving state, microprocessor firmware accepts data from its receiver, tests for errors, and presents validated data to its host equipment. A response is taken to a verified error condition, by dropping Wqr to signal to the transmitter that a retransmission is indicated for the current data packet. The firmware also computes a checksum value for each data packet, and compares it to a transmitted value. At the end of each data packet, the receiver presents an acknowledgement signal to the transmitter to indicate that the packet has been received error free.

A double buffering technique can serve to maximize data throughput by enabling the unit to send validated data from one buffer, while simultaneously receiving CSK data into another buffer. Each time the validated data buffer becomes empty (e.g. all characters have been sent to the host), and a data packet has been received from the CSK receiver and the checksum verified, the buffers are swapped. This technique serves to maximize the flexibility of CSK in the following manner. If conditions are favorable and the incidence of errors in the data stream is minimal, then data is presented to the host at the maximum throughput rate of the system. If the host cannot accept the data as fast as the system presents it, then the network unit slows the flow of CSK data by using its Wqr tone to signal a not ready condition. On the other hand, if conditions are bad and numerous retransmissions are necessary, then double buffering automatically slows down the rate at which characters are presented to the host to accommodate the time necessary for extra retransmissions. The receiver can thus implement a variable speed throughput rate which reflects the variable conditions encountered on the level 1 data transmission link.

This double buffering technique also finds application in the network level firmware of the transmitting units. Since the transmitter is responsive to errors indicated by the receiver by dropping Wqr (either due to line noise or in response to errors detected on the part of the receiver), the data transmission rate is also variable because of the duplicate transfers of data which did not get through. Thus when conditions are good, the unit can accept characters from its host at the maximum throughput rate, but when noise is prevalent, the unit can slow down the flow of characters from its host by using standard (i.e. RS232C (XON/XOFF, RTS/CTS, etc.), RS422, GPIB488, Centronics parallel) handshaking signals to indicate when it is not ready to receive characters.

TRANSPORT LEVEL CONSIDERATIONS

The transport level of a network system is inherently more specialized than the network level, containing many implementation details. In the present system, this level encompasses a wide variety of timing and triggering values which tailor the system to a specific implementation. While all network schemes must be tuned to their particular environment, the CSK system protocol as described herein possesses the ability to fine tune operating parameters in real time during normal operation.

Observations of noise conditions on electrical power wiring reveal that often noise bursts occur in periodic intervals. These noise bursts, if they occur repeatedly in the middle of a transmission block, may effectively occlude communications. It is impossible to predict the interval of such bursts in a particular environment, however if a communication system is capable of modifying its block size to fit between noise bursts, as described in greater detail hereinbelow, then it can deal with a wide variety of possibilities. Shortening the size of the transmission block incurs a minimal penalty in speed, and conversely, when no appreciable noise is encountered, lengthening the block size increases the overall throughput of the system.

Another dynamic transport level parameter modification is in identifying preferred bands of transmission. Since noise is often local to a given frequency range, conditions may occur in which certain transmission bands are more suited to accommodating data transmission than others.

The capability of dynamically modifying operating parameters is another benefit of CSK error detection, since it is the incidence of such errors which is being monitored by the self-adjusting software.

Other functions which are encountered on the transport level are:

1. CHANNEL SCANNING AND THIRD PARTY Interpretation:

This domain of operation enables units to determine when they are being targeted for transmission, which (if any) transmission bands are free in the event a request to send data arrives from their host, and what the general status of each current link on the network is, in the event they are requested to target a unit which is already linked in transmission engaged.

2. CHANNEL CLEAR AND COLLISION Avoidance/Detection:

This involves the utilization of CSK data when attempting to gain control of a band to transmit. In order to ensure that, whenever two or more devices attempt simultaneously to seize a transmission band, only one device is ever successful in doing so, a semaphore system based on user-set device address codes is implemented. This provides the benefit of resolving deadlocks through user-definable device priorities, rather than arbitrarily. Note that CSK renders the collision avoidance function fail-safe, by supplementing it with automatic collision detection. Even if the initial clear channel test should fail and two or more devices begin transmitting on a given band, the superposition of the two data streams will generate CSK errors which will block the data from getting through (unless they are absolutely identical), and result in the termination of one or both links. Since the presence of CSK errors is detected on the bit level, such a condition will be detected faster than by a typical prior art system which does not utilize bit level error detection.

3 SECURITY AND DATA ENCRYPTION

Security in the present CSK system addresses two potential problems, the first is that of a party using a similar receiver to demodulate CSK data which is not intended for their reception, and the second is that of a party using some other device, such as an oscilloscope, to intercept and decode data on the medium. The first problem is dealt with as follows. A device can only receive data which is targeted for its logical address on the network. Whenever a device detects another device on the network with the same device address as itself, it goes into a locked mode in which it cannot be used until it is powered down and its device address reprogrammed to be unique. There are at least two ways to make such a detection. A device may call itself, and see if another device answers, or a transmitting device can initiate a security check as follows. Whenever a device is powered up, it creates a private key for itself by counting time periods until it is given an instruction. Since this time period will be of indeterminate length, the odds against two devices deriving identical keys in this manner is $2^n$, where n is the number of bits in the counter (i.e. sixteen). Then, when a security check is called for, the device transmits its private key over the current transmission band. The initiating transmitter listens for CSK errors, which in this case may be indicative of different devices answering the security check with different numbers. In this manner, CSK can be used to determine when multiple data streams are superimposed on a transmission band, and thus prevent units from being used for eavesdropping purposes. The second problem, that of a party monitoring the line with some type of scope or decoding unit, can be dealt with in a more conventional manner, namely by encrypting the data stream in an undisclosed manner (such as exclusive-ORing successive bits with the output of a maximal length sequence shift register generator). Such encryption schemes, known generally as trap door functions, make it difficult for an uninformed party or device to make sense of the CSK data stream, even if the frequencies and modulation techniques are known.

4. OPTIMIZED FULL DUPLEX OPERATION

The utilization of CSK, as opposed to prior art methods involving redundancy-oriented error detection schemes, incurs no penalty for very short transmissions (i.e. under three bytes), since the overhead for the minimal length transmission is only one byte for checksum data. This means that swapping roles in transmission for full duplex operation between units is quite efficient, even when one unit elects never to send any data. The benefit of bit-level error detection is that the amount of time required for a unit to inform its target that it has no data to send is negligible, due to the absence of error detection overhead required in prior art systems.

5. SELF TEST OPTION

CSK error detection facilitates self testing of units on the network. Since a unit can listen (i.e. tune in) to their own signals, the presence of an abnormally high number of CSK errors may indicate a faulty receiver or transmitter.

SESSION LEVEL SOFTWARE

The session level software essentially defines the function of the network from the host/user's viewpoint. Whereas the network and transport levels make the network function, it is the session level which makes it usable. For this reason, a wide variety of conceivable session level functions may be implemented in a CSK system, not all of which are discussed herein. Instead, the present system focuses on the specific implementation of CSK as a LAN (Local Area Network) system for use in the smaller office or industrial environments. It is important to emphasize that this focus is made without loss of generality, and other possible session level implementations are also discussed, but are not expanded upon to the degree of the LAN application.

A number of operating modes are desirable for a network unit:

1. AUTO ANSWER/INFORM BEFORE ANSWERING. When a scanning unit detects a call for itself on the network, there are cases when automatic answering is preferred (i.e. for an unattended workstation), and cases when call screening is preferred (i.e. for a workstation which is being used, and may not be at a convenient point for interruption). The responsiveness of the network enables it to function similar to a telephone in this respect. Note that parameters such as the number of "rings" to allow before determining a party is absent are inherently adjustable using the CSK dynamic parameter modification attribute.

2. CALL ONCE/REPEATEDLY. Similarly, the ability to control whether a unit tries once, or repeatedly, to place a call to another unit which is not responding offers an added advantage in flexibility. Due to channel scanning software on the transport level, a unit can determine precisely when a busy target disconnects from its present link. In the case of a target which is not busy but is still not responding, the amount of time to wait between successive attempts to call is another parameter which can be subject to modification for optimal tailoring to user needs.

3. DEVICE PRIORITIZATION. The priority of a device in the overall network can be set by the user. Priorities affect not only deadlock resolution, but also may be applied to interrupts and device accessibility. In addition, high priority devices may reserve transmission bands, either by convention or by placing CSK signals on the band at periodic intervals, even conceivably while maintaining a link on another band. Again, it is the responsiveness of CSK that enables prioritization to be implemented without significant loss of data throughput, because of the extremely low overhead requirement.

4. INTERRUPTS. A desirable feature in a LAN is the ability to be able to contact any node on the network at a moment's notice, even if the target device is currently engaged in another link. In an office environment, this means priority memos and messages can get through even on a busy network, while in an industrial environment, this means that exceptional circumstances may be recognized nearly instantly by all affected devices, even while they are communicating unattended with one another. The implementation of interrupts relates to all levels of CSK technology, including prioritization and setting of answer modes on the session level, and the low overhead of network commands for full duplex operation on the transport level, down to the double buffering technique of the network level. The technique for initiating interrupts relies on the above mentioned capability of scanning devices to monitor the current state of target devices, while the technique for detecting interrupts is similar in nature to a self test, in that it is built on a device's capability of listen to transmissions on the channel it is transmitting on (e.g. if it drops Wqt for a brief period of time, and yet detects Wqt in the absence of its own transmission, then it can conclude an interrupt is pending on the line). The decision of a unit to accept an interrupt may be based on a variety of variables, include the priorities of itself, its target, and the interrupting device, as well as a priority which may be assigned to its current transmission and the interrupting transmission, as well as its option to poll the user for a decision. A wide variety of possibilities is easily accommodated in a CSK system because of its responsive and reliable nature 5. CALL WAITING/CALL FORWARDING. These features, popularized by AT&T's new ESS (Electronic Switching System) technology offer considerable benefits in a network. Call waiting enables a host or user to screen incoming calls while linked with another device, and either allow the current transmission to be interrupted, or respond in some other manner (such as through an intercom or local telephone line). Call forwarding allows a unit to instruct all callers to forward messages to another device. This is useful for executives who may be in any of several on-line locations (office or one of several conference rooms) at any given time, and need constant access to all forwarded information.

6. USER INTERFACE. The remaining elements of the session level software fall into the domain of user interface. They include a command interpreter for accepting instructions from either an operator (via front panel switches) or an electronic host (via standard serial interface), a set of messages (for identifying the state of the unit and reporting errors), and a set of network commands for communication between network units. The philosophy behind the design of these facets of the network is to maximize the trade-off between simplicity and versatility. In relating these aspects to a CSK system, the simplicity and straightforwardness of the network's session level design is made possible by the initial guarantee of CSK communications that data can be relied upon to be error free, and therefore the inherent overhead in implementing equivalent functions on other systems is avoided, resulting in a low cost network of unparalleled flexibility.

With reference to the ISO OSI model, a CSK transmission corresponds with a level 2 (DATA LINK) network function. The level 1 (PHYSICAL LINK) is unspecified beyond that a wave guide of some sort must be used. The present system protocol for modulation and demodulation of CSK-encoded data is designed to encompass roughly levels 3 and 4 of the ISO OSI model for communication networks (NETWORK and TRANSPORT layers). All higher levels are implementation specific, and accordingly are not discussed in detail herein.

The disclosed system is a broadband implementation of a CSK system wherein several transceivers located at CSK nodes share an unspecified number of communication channels in a designated frequency band over a waveguide. The units use Frequency Division Multiplexing (FDM) to allow simultaneous use of different channels by different nodes which are linked on the medium. Thus the total data throughput of the system may be determined by multiplying the throughput of each channel by the number of channels.

The signals W0, W1, Wqt and Wqr can be described as being either transmitted (in which case they are suffixed with "-out") or received (in which case they are suffixed with "-in") over the waveguide.

The exemplary system is described in terms of a set of transceivers at different nodes which are coupled to the waveguide. Each transceiver at each node may be in one of three states at any given time:

1. Transmitting. A transmitting node is generating signals from the following set:
   a. Wqt-out.
   b. W1-out,
   c. W0-out It is receiving signals from the following set:
   a. Wqr-in.

2. Receiving. A receiving node receives signals from the following set:
   a. Wqt-in.
   b. W1-in.
   c. W0-in.

It is transmitting signals from the following set:
   a. Wqr-out.

3. Scanning. A scanning node is receiving signals from the same set as a receiving node. However, it does not generate a Wqr-out signal in response thereto.

Requests for transceivers at the nodes to change state are presented by SESSION layer routines external to the exemplary system. In practice, these requests are generally initiated by users or processes utilizing APPLICATION level routines which handle the propagation of requests down through lower levels of a full OSI model.

In the system protocol, a data packet can be subdivided into the following four major fields.

MARK/HEADER/DATA/CHKSUM

Additionally, the HEADER field can be broken down into the following subfields, elaborated upon hereinbelow.

SEQ./DL/CHAN./TARGET/SENDER/LINK CALL/SWAP/ORIGINAL TARGET/TRANS. ADD./REC. ADD./CALL STAT./UNLINK-/CALLBACK

The function of each field is described as follows:

MARK—A synchronization period to allow a receiver to verify the start of a CSK data packet, which may comprise a steady transmission of only W0 or W1 and Wqt.

HEADER—A field of protocol-specific data which affect transmission dynamics in a specified way. The HEADER field is divided into different sub-fields, several of which are shown above and described in greater detail hereinbelow.

DATA—A field of data external to the exemplary system, which is intended to be sent from the host equipment of the transmitter node to the host equipment of the receiver node. The binary encoding of data is unspecified.

CHKSUM—A field included for verification of proper interpretation of the data packet by the receiver. Although the term "checksum" has a generally accepted meaning in transmission terminology, the derivation of the CHKSUM field for the present system is not specifically defined, except for the specification that, for any given data packet, a given CHKSUM field is either valid or invalid. In practice, the more space allocated for the CHKSUM field, the lower the probability that two unique packets will share the same CHKSUM value. Also, a variety of techniques are available to improve the space efficiency of a given CHKSUM field. However, it should be noted that, as the CHKSUM field is not the primary manner of error detection in a CSK system, excessively complex schemes are generally superfluous, and would in practice tend to decrease transmission throughput unnecessarily. In a preferred embodiment, the CHKSUM field is a modulo-n bit binary sum (sum of the binary bits in the data field) of the data packet.

FIG. 5 illustrates a logic flow diagram for a basic CSK receiver, showing testing for the presence of Wqt and a complementary relationship and the generation of a Wqr response, and FIG. 6 illustrates a logic flow diagram for a basic CSK transmitter, showing its response to the presence and absence (dropping) of Wqr.

FIG. 5 illustrates how a receiver responds to CSK-level errors when receiving a CSK signal. The two error conditions tested are:

1. Wqt present. The absence of Wqt while transmission is expected is referred to as a Wqt error.

2. A test for the complementary nature of logic levels indicated by W0 and W1, which can be conducted conveniently in hardware by an exclusive OR gate, as illustrated in FIG. 4, or can be conducted in software or firmware. If at any time during a CSK data transmission this test fails, the signal is considered invalid and the associated data are discarded. During proper data transmission, W1 is taken to be an image of bits in the data stream, and W0 is taken to be a complement of that image.

The receiver logic flow diagram of FIG. 5 illustrates how the receiver utilizes Wqr-out in response to Wqt-in and the test for a complementary relationship between W0 and W1. The transmitter flow diagram of FIG. 6 describes how the transmitter responds to a loss of Wqr from the receiver. FIG. 7 depicts several exemplary waveforms, illustrating the various timed responses to the presence and loss of Wqt, a complementary relationship and Wqr. The timing waveforms of FIG. 7 shows how this process provides virtually instantaneous (bit-level) error detection and the replacement of erroneous data in the case of the two types of CSK errors described above. A detail to note is that period F (trigger time for loss of Wqt) can be selected to be longer than period B (trigger time for loss of complement) to ensure that intermittent noise does not cause an excessive number of retransmits when valid data is being received.

FIG. 8 illustrates the timing periods of both a transmitter and a receiver during the Acknowledge timing period at the end of the transmission of a data packet. More particularly, it shows the receiver's response to the reception of a valid CSK data packet. It also describes the respective responses of the transmitter and receiver to exceptions to the proper form. It should be noted that the timing form as illustrated and described should be taken without loss of generality, it is a minimum requirement to which subsequent periods could be added without deviating from the basic concept. In other words, additional logic level changes may occur in both Wqr and Wqt during the acknowledge period, as long as they are defined by the specific system, and fit the intention of the system implementation, which is to provide both transmitter and receiver with confirmation of the reception of a valid CSK-encoded data packet.

FIGS. 9 and 10 are logic flow diagrams respectively for a receiver and a transmitter during the Acknowledge timing period. FIG. 9 illustrates that the receiver tests for a drop in Wqt in period A, maintains transmission of Wqr during period B, tests that Wqr remains low during the same period, drops Wqr during period C, and tests that Wqt remains low during period E. FIG. 10 illustrates that the transmitter drops Wqt after the last character or bit of the data packet, tests that Wqr remains high for the period B, tests that Wqr drops in period C and then remains low through period D. If all of the aforementioned conditions have occurred, the Acknowledge period indicates a valid transmission of that data packet.

FIGS. 11 and 12 are logic flow diagrams respectively for a receiver and a transmitter for the SEQUENCE subfield of the HEADER field portion of a data packet. The SEQ subfield is designed to protect against errors which may occur during the Acknowledge period. Typically, two different types of errors might occur at the transmitter during the Acknowledge period:

1. A positive acknowledge sent by the receiver is perceived as negative by the transmitter (because of noise in the Wqr signal band).

2. A negative acknowledge sent by the receiver is perceived as positive by the transmitter.

Of the two, the second is considered far less likely, and is also more costly in time to recover from. While error 1 will result in the discard of one (superfluous) packet, error 2 requires the retransmission of n packets, where n is the number of packets before the receiving and transmitting nodes reverse roles. Type 2 errors may occur due to leakage from other transmission bands, in cases where a system is operating near the edge of its dynamic range. This condition may be minimized by adding channel-specific protocol to the form of the acknowledge period to reduce the possibility of a spurious signal (or random noise) matching the form.

The protocol signals are also used to frame each CSK packet to enable the receiver to judge accurately the start and end of each packet in a CSK transmission. In order for a message to be received accurately, not only must the composite data be received without error, but the receiver must remain synchronized with the transmitter so that the data field in each packet can be successfully extracted and added to the incoming data stream. If this were not the case, then data, chksum, and header field information could become garbled.

In order for the transmitter and the receiver to make proper use of the Acknowledge period, they must know when the current packet is expected to end. One method for assuring that they both know would be to transmit packets whose length is fixed. However, in a noisy environment it is often not practical to rely on fixed length data packets to insure proper framing, for three reasons:

1. Since an error may be detected at any time, and furthermore since the error status of a transmission may be perceived differently by the receiver and transmitter at any given time (see FIG. 8 timing diagram), it is possible for units to get "out of step" when one attempts to restart the packet, while the other continues to send-/receive it.

2. Since available data and header field requirements may vary during a transmission, considerable time may be wasted in "padding" a fixed-length packet.

3. Since noise conditions may vary among differing wave guides, or among a single waveguide at various times, it may not always be possible to transmit packets of a given length. In this case, shortening the data packet size may resolve an occlusion condition on the physical link.

For these reasons, the present system specifies a variable packet length, with the following methods for eliminating framing errors.

FIG. 13 illustrates a logic flow diagram of the response of a receiver to the CHKSUM field portion of a data packet, and indicates how the placement of the CHKSUM field at the end of the data packet ensures synchronization, by placing an expected value on the final field of the packet. It is also noted that the verification of a CHKSUM field enables a receiver to detect errors which have not occurred on the physical link, but rather in the section of the transmitter which receives data from its host and prepares it for transmission over the medium. Since physical hardware must control the reception, latching, and retransmission of the host's data, a malfunction in this hardware could cause data to be altered. However, since the CHKSUM field is generated prior to the retransmission of the data, malfunctions in this stage of hardware will produce CHKSUM errors in the receiver, which will in turn discard the erroneous data.

The Header field contains a Data Length (DL) which corresponds to the number of data units (i.e. characters or bytes) in the DATA field. Note, however, that the data field may in certain cases be empty. In this case, an alternate HEADER field mapping may be used which does not include a Data Length subfield. If the Data Field is not empty, however, then the Data Length subfield of the Header field must specify the length of the data. Note also that the method of specifying length need not be linear, but could be logarithmic (which would effectively increase the dynamic range of Data Length/DL subfield length at the expense of the Data Length resolution (i.e. 2 and 4 may be valid (consecutive) lengths, but 3 may be invalid)), or subject to a mapping function of the user's choice (i.e. a table of data lengths, indexed by the DL field).

The system protocol signals can also be used to prevent spurious use of CSK transmissions and media. Nodes which share a common transmission environment must utilize the environment according to a rigorous standard if they are to co-exist without interfering with one another. The exemplary embodiment is designed to use random addressing of nodes, and also allow the use of multiple transmission bands on a common medium. To prevent collisions and misdirected messages, the system protocol is designed to provide the following problem resolution.

A first problem involves receiving signals from an adjacent transmission band. Although a transmission system is generally designed in such a way as to filter most leakage between adjacent bands, often in a noisy environment, incoming signal levels will be unknown prior to reception and may vary greatly from session to session. For this reason, it is necessary to design the receiver hardware to be capable of adapting to various incoming signal levels by attenuating levels which are too high, and amplifying levels which are too low. Unfortunately, it may be the case that hardware which is designed to amplify low signals may not be able to distinguish between a low in-band signal and a high out-of-band signal, whose roll-off attenuation has a finite slope into adjacent frequency bands. For this reason, the system protocol provides a method for distinguishing in-band signals from out-of-band signals, by encoding a band identifier into a CHANNEL subfield of the packet HEADER field. By comparing the encoded band identifier with the identifier of the band to which the receiving node has set its own receiver, the receiving node can recognize when a signal is being received from an adjacent band, even if it is perceived as being a valid CSK signal.

A second problem involves receiving signals intended for another device. In order to prevent a message from being demodulated by any but its intended recipient, the system protocol provides two additional subfields in the packet HEADER field:

1. A Target Address Field, which contains a unique identification code for the intended recipient, and 2. A Link/Call field, which describes whether the transmitter considers itself to be actively linked, or in the process of establishing a new link.

These two subfields work together to ensure:

a. that, when a transmitter attempts to establish a link with an intended receiver, the proper receiver answers;

b. that, when two nodes are linked, all other nodes can record this condition (see FIG. 17); and c. that, when an error has been made which has allowed two or more nodes to use the same unique identification code, this situation can be detected and announced.

FIG. 14 is a logic flow diagram of the response of a receiver to the CHANNEL and LINK/CALL subfields of the HEADER field portion of a data packet, and shows how a. and c. are accomplished by the receiver. The term "dupe addr" is used to identify the condition in which two or more devices share the same identification code. In this logic flow diagram, if the Target address in the HEADER does not equal the local address, the rest of the data packet is received to verify that the data is correct. In the decision box LINK/CALL=CALL, the condition is checked that the transmitter has received Wqr from the "dupe addr" receiver, and has changed state. When a "dupe addr" is detected, the operation of the receiver is halted until the condition is changed by the user.

A third problem involves errors in roles. In order to meet the requirement of full duplex operation without allocating unnecessary bandwidth for simultaneous two-way operation, the system employs Time Division Multiplexing (TDM) on a single simplex channel. This means that, while at any given time only one node is either transmitting or receiving data, the communicating nodes may switch roles often during a transmission session to permit data to be sent in both directions. Rules for when a pair of linked nodes may swap are unspecified by the exemplary embodiment. However it should be noted that, in practice, swapping should take place often enough for the system to appear to operate in a fully duplex mode to the higher level processes which utilize the system. In practice, swap time may be derived from a number of transmission parameters such as amount of data waiting to be sent in either direction, speed at which data can be accepted by a given host, noise conditions on the medium, detection of SEQ errors, etc.

The difficulty in implementing a TDM system of this nature in a noisy environment is avoiding deadlocks when an error occurs during the Acknowledge period. Errors in this period which precede a swap operation may cause both units to become transmitters or (more rarely) receivers, causing an occlusion of data which may be permanent, if some recovery action is not taken. To alleviate this problem, the system specifies a field in the memory of each node which records, at the time a link is established, whether the node was the originator of the link. Therefore, at any stage during a transmission session, this field, known as the ORIGINAL TARGET field, will be complementary in the two units involved. The complementary nature of this field between the two linked units ensures that when a swap error is determined to have occurred (by recording a certain number of consecutive CSK errors), the units are assured of returning to a state wherein one is a transmitter and the other a receiver. This process is described in the pair of logic flow diagrams in FIGS. 15 and 16 respectively for a transmitter and receiver to a SWAP command subfield in the HEADER field portion of a data packet, and illustrates the responses of the transmitter and receiver to the receipt of erroneous CSK data after a SWAP command has been initiated by the transmitter.

In summary, an error which occurs during the Acknowledge period of a packet whose HEADER field indicates that a swap will occur on the next packet can cause two units to assume the same role (receiver/transmitter) in a link, at which time data will not be received. The situation is corrected when each unit defaults to its original role when the session was started, after n CSK errors have occurred in succession. Note that if the CSK errors were not due to a role error, defaulting to original roles causes no harm, and merely ensures that when medium conditions return to an acceptable state (which they must have been in when the link was originally established), that both units are in opposite states, and are therefore able to transmit and receive CSK data correctly.

In addition to the transmitting and receiving states, a system node may also be in a state known as the scanning state. When unlinked, the transceivers at all nodes constantly scan and keep undated records of all network activity. This is done by successively demodulating CSK data on the defined channels of operation, without providing the handshaking output (Wqr) of a receiving node. The scanning state is required to eliminate the following two type of errors:

1. Attempting to establish a link on a channel which is already in use, and

2. Attempting to establish a link with a device which is already linked with another node on the network.

The scanner logic flow diagram of FIG. 17 illustrates how a scanning unit utilizes CSK data to determine if a given channel is free or in use. Note that due to varying dynamics on an unconditioned waveguide, one receiver may perceive more CSK errors in a transmission packet than another, and, more specifically, a scanner may perceive more CSK errors in a data packet that the actual intended receiver of the data packet. Thus, it is necessary to damp the CSK error information to compensate for this possible discrepancy. This compensation is illustrated in the decision block marked Count n.

Note also, maintaining a target subfield in the HEADER field of a transmission packet allows scanning units to keep track of the involvement of all network nodes in various links on the system. For the purposes of completeness, another subfield containing the sender's ID code (address), entitled SENDER is also specified for the system protocol.

FIG. 18 illustrates how information accumulated in FIG. 17 during the scanning state is utilized when a higher-level process (or user) requests a unit to establish a communication link. In the event that the request is not currently possible (due to one of the two conditions mentioned above), an appropriate message is issued, and the unit remains in a waiting state, where the request is continually tried until it is either successfully completed, or aborted by the process which initiated it.

Note that the two errors will result in different types of waiting states. Error 1 (all specified channels are in use) will cause the unit to return to a scanning state, differing from the regular scanning state in that, as soon as a channel is determined to be free, the unit will attempt to utilize it to make the requested link (after determining that the specified target is not linked with any other node). Error 2 (specified target is currently linked), however, will cause the unit to restrict its scanning activities to the channel on which the selected target is linked, as indicated by the left side of the logic flow diagram of FIG. 18. If neither of the above errors has occurred, then the unit performs a CLEAR CHANNEL TEST, the purpose of which is to resolve collisions between units which attempt to utilize the same channel simultaneously. FIGS. 21 and 22 illustrate the logic flow diagram of another, primary method which the system uses to resolve potential collisions. However, the CLEAR CHANNEL TEST is also provided, and basically involves the utilization of the unique device address code to ensure that each unit which may be in collision will select a unique time slot in which to reexamine network conditions to determine if the channel they are attempting to use is actually free (as well as to determine if the device they are attempting to link with is still actually free). In the CLEAR CHANNEL TEST each time a valid acknowledgement is not received from the target unit, an error count is incremented until is reaches a count number based on its own unique address, at which time it reverts back to an initializing of the attempt to establish the communication link, as indicated by the right side of the logic flow diagram of FIG. 18.

Figures 19, 20:
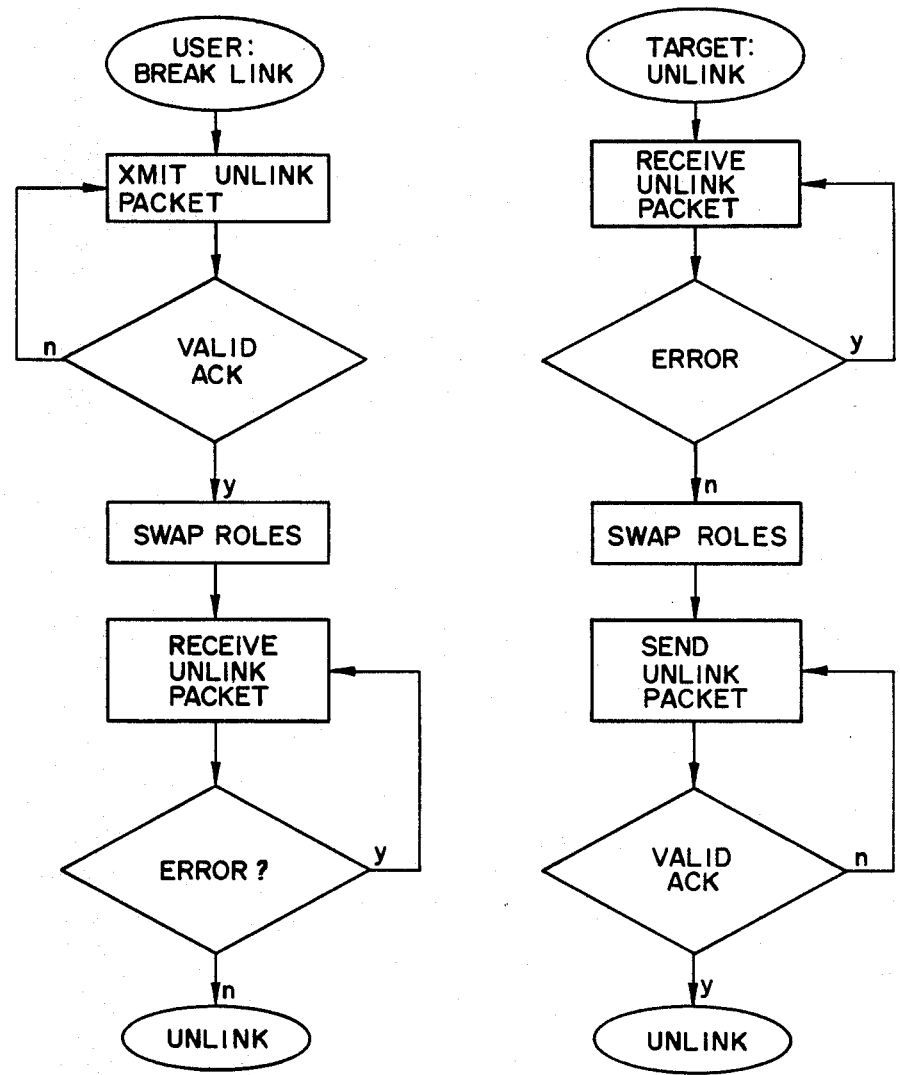
FIGS. 19 and 20 are logic flow diagrams respectively for the responses and actions of a transmitter and receiver wherein an UNLINK command subfield has been included in the HEADER field portion of a data packet.

FIGS. 19 and 20 are logic flow diagrams respectively for a transmitter and receiver attempting to execute an UNLINK command in the HEADER field portion of a data packet. These figures describe the disposal of a link in response to a request to do so from a higher level process (or user). As with role swapping, a potential hazard exists in the case of an error occurring during the Acknowledge period of a packet whose HEADER field's UNLINK subfield indicates a request to break the link has been issued. Without confirmation, in the form of a return CSK packet, such an error would cause one unit (the receiver of the unlink packet, in most cases since a spurious positive acknowledge is rare compared with a spurious negative acknowledge see FIGS. 11 and 12 and accompanying text) to go offline, while the other continues to attempt to send or receive data with the missing unit until a timeout or some other preventive mechanism causes it to unlink, under abnormal circumstances.

Since a CSK system is designed to be used in environments where total signal occlusion is expected from time to time, the units are designed to continue to attempt to maintain a communications link even during times when no valid signals are being received by both or either unit. Conditions such as hardware failure or loss of power in a unit which is involved in a link should cause its target unit to abandon efforts to resynchronize only after a considerable period of time has elapsed, that period being greater than the duration of the longest expected noise burst on the medium. FIGS. 19 and 20 illustrate logic flow diagrams of the normal way a link is disposed of, to prevent spurious use of the CSK channel.

FIGS. 21 and 22 are logic flow diagrams of the CALLBACK command subfield of the HEADER field portion of a data packet and illustrate a primary method of avoiding collisions on a CSK channel. In this diagram, a CALLBACK subfield is identified (in practice, this field may be indistinct from the UNLINK subfield, since the contexts in which they will be used provide the necessary logical distinction to prevent misinterpretation). When an original target unit (see FIGS. 15 and 16) becomes free, it retains control of the channel on which is was formerly linked, in order to execute a polling sequence in which each unit whose address is in the system address space in memory is consecutively tested for intent to link with the unit performing the test. Referring to the left side of the logic flow diagram of FIG. 18, it is noted that when a unit is instructed to establish a link with another unit which is already linked, the former unit will remain in a waiting state, tuned into its intended target's channel. It is in this state that such a unit will be polled, and will thus have the opportunity to establish the desired link without danger of delays caused by collisions with other units which may be attempting to establish links with the same target, or with another target utilizing the same channel. FIG. 21 illustrates how a unit in a scanning state responds to a CALLBACK command subfield. The CALLBACK SET decisional box in FIG. 21 distinguishes between a regular call which is answered in a normal manner, and a call involving a CALLBACK subfield, to which the unit responds by returning to a scanning state? The polling system also has the benefit of imposing a priority ordering on system addresses, to allow for prioritized service by units which are typically used as targets, rather than initiators of links. In the priority system of FIG. 22, the highest priority unit is given the highest address.

It should be noted that for consistency, although the illustrated polling system casts the original target in the role of initiator in any link it may establish while polling, in terms of the original role designation described in FIGS. 15 and 16, the polling unit retains the identity of an original target, and the polled unit (whose higher level process or user's request to link initiated its entry into the wait state) retains the identity of an original caller. In practice, this ensures that units which are typically in high demand as targets will tend to employ the polling technique more often than those whose role is more frequently that of an initiator.

CSK information can also be utilized to improve utilization of a noisy waveguide. In addition to providing protection against errors which may occur as a result of noise on the local waveguide, the CSK information may be used to characterize a waveguide so as to make more efficient use thereof. In many cases, this characterization can mean the difference between effective usability and untenability of the waveguide in question. It is the presence and frequency of CSK errors which can be used to characterize noise conditions on the medium, and it is this characterization which, in turn, are utilized to drive a channel selection function and a packet length assignment.

FIG. 23 is a logic flow diagram illustrating the implementation of an adaptive data packet length in a CSK transmitter, whereby the length of the data packet is adjusted to adapt to noise conditions existing on the physical communications link, and FIG. 24 illustrates exemplary waveforms illustrating the functions of the adaptive data packet length. An adaptive packet length improves the utilization of a noisy waveguide. Each unit maintains a memory field indicating a maximum effective packet length for transmission, and also a minimum packet length to enable transmission. During power-up, all adaptive packet lengths are initialized and are set to the maximum effective packet length, and during transmission, CSK errors trigger the adaptive packet length to shrink towards the minimum packet length. A subsequent lack of errors during transmissions causes the packet length to grow towards the maximum again. As indicated in FIG. 23, during power-up, there is an initialization of a memory field allocated for variable packet length information in each system unit. The packet length is initially set to the specified maximum, to ensure maximum throughput when conditions are good. When conditions are noisy, the packet length shrinks to minimize the time penalty incurred by a packet retransmission. The waveforms of FIG. 24 illustrate a hypothetical noise condition (often found, for example, on AC power wiring) in which periodic noise spikes block transmission signals at a regular interval. If the system packet length were fixed, such a condition could have the effect of completely occluding all signals on the waveguide. However, since the packet length is adaptable, shrinkage allows packets to become synchronized with the noise spikes, and to only be transmitted during the periods between the spikes. Thus CSK information provides a characterization of noise conditions sufficient to render usable an otherwise unsuitable transmission medium.

Figure 25:
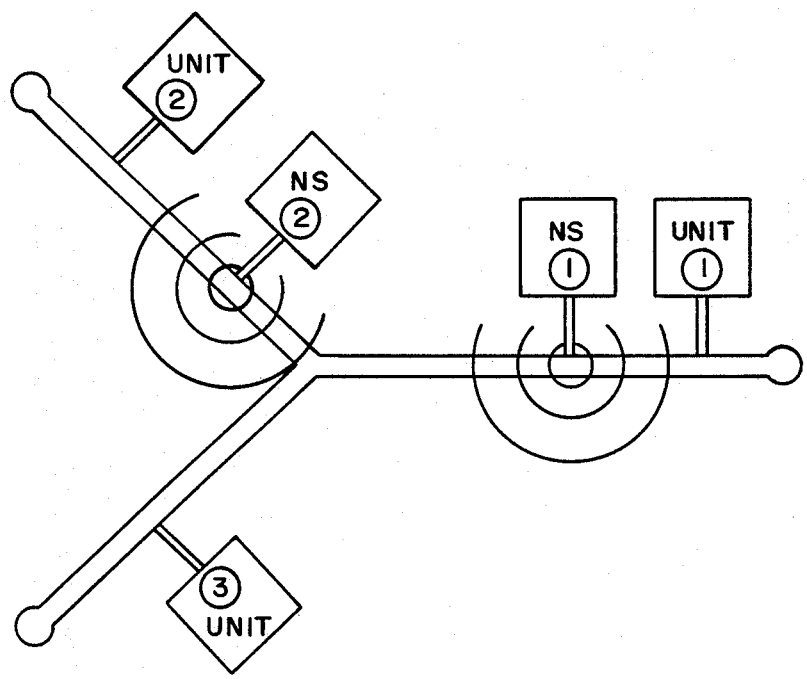
FIG. 25 illustrates a specific network example having different local noise sources, which can be compensated for pursuant to the teachings herein.
Figure 27:
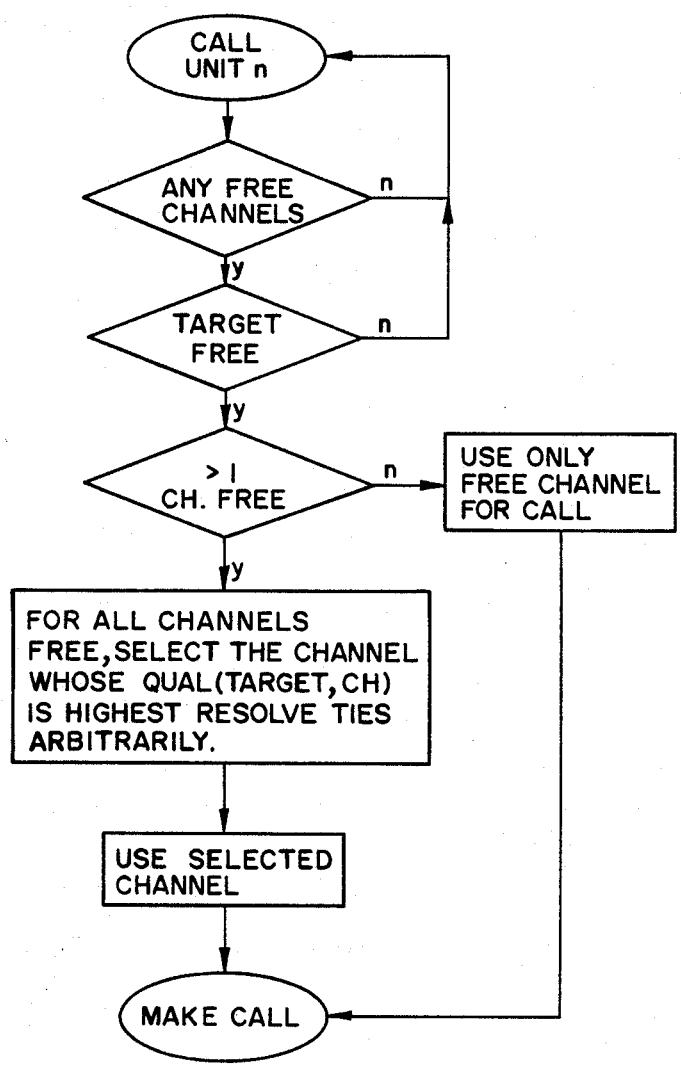
FIG. 27 is a logic flow diagram illustrating how CSK information history stored in memory assists in compensating for different noise sources.

Often it is the case that noise conditions in a broadband system will vary across the frequency span utilized. In such a case, it would be desirable to avoid areas of the spectrum in which noise conditions are worst, and favor areas in which they are best. Moreover, frequency-dependent noise may also vary locally, so that optimal channels may vary depending on the relative locations of units and noise sources coupled to the waveguide. FIG. 25 illustrates an example of this, on a hypothetical waveguide to which three units and two noise sources are coupled. In FIG. 25, noise source 1 primarily affects transmission band 1 locally to unit 1, and noise source 2 primarily affects transmission band 2 locally to unit 2. Therefore, the transmitter in unit 3 should prefer a transmission band other than band 1 when linked with unit 1, and should prefer a transmission band other than band 2 when linked with unit 2. The noise sources are assumed to be frequency-specific, and thus affect certain transmission bands only. Since they affect specific different bands, a CSK waveguide characterization preferably causes the unit 3 to prefer different bands when addressing the two other units. FIG. 26 shows how this is accomplished, by storing packet length information acquired through the method in FIG. 23 in an array indexed by target device and channel number. The array, designated QUAL in this example, is updated at the end of each communication link to reflect the information derived about the target, channel combination just utilized.

By utilizing the data packet length acquired in FIG. 23, each unit can determine the best channel to use for a given selected target in cases where dynamics are unequal in different areas of the frequency/topology of the transmission medium. In this manner, each unit maintains its own stored record in memory of the history of usage of the waveguide, which is constantly being updated during network operations, which drives the decision-making process regarding which of a set of free channels to select when requested to link with a given target.

While several embodiments and variations of the present invention for a system protocol for a CSK communications system are described in detail herein, it should be apparent that the disclosure and teachings of the present invention will suggest many alternative designs to those skilled in the art.

What is claimed is:

1. A composite shift key method of communication for binary signals, comprising:
   a. transmitting binary signals from a transmitting transceiver having a transmitter and a receiver by transmitting a first summed signal having a first qualifying signal at a qualifying signal frequency Wqt as one of the summed signal components only when a binary signal, either a binary zero or a binary one, is desired to be transmitted, and algebraically summing a first frequency signal W1 with the first qualifying signal Wqt to produce a first summed signal which is transmitted when a binary one is desired to be transmitted, and by algebraically summing a second signal at a second frequency signal W0 with the qualifying signal Wqt to produce a second summed signal which is transmitted when a binary zero is desired to be transmitted, and ceasing transmission of the first qualifying signal at the qualifying signal frequency Wqt as a transmitted signal or as a component of a composite summed signal when neither a binary zero nor a binary one is desired to be transmitted;
   b. receiving the transmitted signals at a receiving transceiver having a transmitter and a receiver, identifying a binary one signal only when the qualifying signal Wqt and the first frequency signal W1 are received simultaneously as the first summed signal, and identifying a binary zero signal only when the qualifying signal Wqt and the second frequency signal W0 are received simultaneously as the second summed signal; and
   c. signalling from the receiving transceiver to the transmitting transceiver when the first qualifying signal Wqt is received simultaneously with the first frequency signal W1 as the first summed signal or when the first qualifying signal Wqt is received simultaneously with the second frequency signal W0 as the second summed signal, that the binary signal transmission is being successfully received, by transmitting from the receiving transceiver a second qualifying signal Wqr, and dropping the transmission of the second qualifying signal Wqr when the first qualifying signal Wqt is not received simultaneously with the first frequency signal W1 as the first summed signal or when the qualifying signal Wqt is not received simultaneously with the second frequency signal W0 as the second summed signal, to signal to the transmitting transceiver that the binary signal transmission is not being successfully received.

2. A composite shift key method of communication for binary signals as claimed in claim 1, said transmitting steps being performed over available AC power supply lines to form a local area communications network.

3. A composite shift key method of communication for binary signals as claimed in claim 1, said receiving transceiver testing the signals W1 and W0 for a complementary, exclusive OR relationship, and also dropping the transmission of the second qualifying signal Wqr when the first frequency signal W1 and the second frequency signal W0 are not complementary signals, to signal to the transmitting transceiver that the binary signal transmission is not being successfully received by the receiving transceiver.

4. A composite shift key method of communication for binary signals as claimed in claim 1, said transmitting transceiver receiving the second qualifying signal Wqr during a binary signal transmission and maintaining its transmission of binary signals when Wqr is received, indicating a successful binary signal transmission, and dropping and restarting transmission of the binary signals in response to the transmission of Wqr being dropped by the receiving transceiver, indicating an unsuccessful binary signal transmission.

5. A composite shift key method of communication for binary signals as claimed in claim 1, said transmitting transceiver transmitting binary signals in data packets, and dropping transmission of the first qualifying signal Wqt after transmission of a data packet, and said receiving transceiver dropping transmission of the second qualifying signal Wqr in response to a dropping of the first qualifying signal Wqt after transmission of a data packet.

6. A composite shift key method of communication for binary signals as claimed in claim 5, said transmitting transceiver transmitting a data packet having a subfield at the beginning thereof indicating the expected length of the data packet, and said receiving transceiver timing the dropping of the first qualifying signal Wqt after transmission of a data packet to ensure that the dropping of Wqt is within an expected Wqt dropping interval as indicated by said subfield, and if so, the receiving transceiver dropping transmission of the second qualifying signal Wqr within an expected Wqr dropping interval, and said transmitting transceiver timing the dropping of Wqr to ensure that the dropping of Wqr is within said expected Wqr dropping interval, and the transmitting transceiver accepting the dropping of Wqr within the expected Wqr dropping interval as a signal that the data packet was successfully received by the receiving transceiver.

7. A composite shift key method of communication for binary signals as claimed in claim 6, said transmitting transceiver transmitting a CHECKSUM signal at the end of the data packet which indicates an expected sum of binary signals in the data packet, said receiving transceiver receiving the CHECKSUM signal and comparing it with the actual sum of binary signals received thereby in the data packet, and if the expected and actual sums of binary signals are equal, said receiving transceiver dropping transmission of Wqr within said expected Wqr dropping interval as a signal to the transmitting transceiver that the data packet was successfully received by the receiving transceiver, and if the expected and actual sums of binary signals are not equal, said receiving transceiver dropping transmission of Wqr outside said expected Wqr dropping interval to signal to the transmitting transceiver that the data packet was not successfully received by the receiving transceiver.

8. A composite shift key method of communication for binary signals as claimed in claim 1, said transmitting transceiver transmitting binary signals in data packets and transmitting a data packet SEQUENCE subfield as part of the data packet, and the transmitting transceiver transmitting the next data packet and incrementing the SEQUENCE subfield therein after it has been signalled by the receiving transceiver that the previous data packet was successfully received by the receiving transceiver, and the transmitting transceiver retransmitting the previous data packet with the same SEQUENCE subfield when it has not been signalled by the receiving transceiver that the previous data packet was successfully received by the receiving transceiver.

9. A composite shift key method of communication for binary signals as claimed in claim 1, said transmitting and receiving transceivers being capable of transmitting and receiving signals over a plurality of different communication channels, each of which has a different frequency band allocation, which channels are also shared by additional similar transceivers, said transmitting transceiver transmitting binary signals in data packets and transmitting a data packet CHANNEL subfield as part of the data packet, and said receiving transceiver comparing the received CHANNEL subfield with an expected and stored CHANNEL subfield, and if the received and stored CHANNEL subfields do not match, the receiving transceiver taking the mismatch as an indication that the data packet is for a different channel, said transmitting transceiver also transmitting a data packet TARGET subfield as part of the data packet, and said receiving transceiver comparing the received TARGET subfield with its own stored TARGET address, and if the received and stored TARGET subfields do not match, the receiving transceiver taking the mismatch as an indication that the data packet is for a different TARGET address, said transmitting transceiver also transmitting a data packet SENDER subfield as part of the data packet, and said receiving transceiver accepting the received SENDER subfield as the identity address of the transmitting transceiver.

10. A composite shift key method of communication for binary signals as claimed in claim 1, said transmitting transceiver transmitting binary signals in data packets and transmitting a data packet LINK/CALL subfield as part of the data packet, and said receiving transceiver accepting the received LINK/CALL subfield as an indication that the transmitting transceiver is either linked in transmission or is calling to establish a communications link.

11. A composite shift key method of communication for binary signals as claimed in claim 10, said transmitting transceiver transmitting a data packet TARGET subfield as part of the data packet, and said receiving transceiver comparing the received TARGET subfield with its own, stored TARGET address, and if the received and stored TARGET subfields match, and the receiving transceiver has also determined from the LINK/CALL subfield that the transmitting transceiver is linked in transmission with another transceiver having the same TARGET subfield, then the receiving transceiver terminating its operation and indicating a duplicate address error.

12. A composite shift key method of communication for binary signals as claimed in claim 1, said transmitting transceiver transmitting binary signals in data packets and transmitting a data packet SWAP subfield as part of the data packet, and said receiving transceiver accepting the received SWAP subfield as a command from the transmitting transceiver that, after transmission of that data packet, the transmitting transceiver and the receiving transceiver are to exchange roles, with the receiving transceiver becoming the transmitter and the transmitting transceiver becoming the receiver during transmission of the next data packet.

13. A composite shift key method of communication for binary signals as claimed in claim 12, said transmitting transceiver transmitting a data subfield as part of the data, indicating which transceiver was the original transmitter and the original receiver, and the transceivers reverting to their original roles after a given number of binary signal transmissions have been attempted unsuccessfully.

14. A composite shift key method of communication for binary signals as claimed in claim 1, wherein:
 a. said transceivers are capable of transmitting and receiving signals over a plurality of different communication channels, each of which has a different frequency band allocation, which channels are also shared by additional similar transceivers;
 b. each transceiver, when in a state of transmission, transmitting binary signals in data packets and transmitting a data packet CHANNEL subfield as part of the data packet, and said receiving transceiver comparing the received CHANNEL subfield with an expected and stored CHANNEL subfield, and if the received and stored CHANNEL subfields do not match, the receiving transceiver taking the mismatch as an indication that the data packet is for a different channel, said transmitting transceiver also transmitting a data packet TARGET subfield as part of the data packet, and said receiving transceiver comparing the received TARGET subfield with its own stored TARGET address, and if the received and stored TARGET subfields do not match, the receiving transceiver taking the mismatch as an indication that the data packet is for a different TARGET address, said transmitting transceiver also transmitting a data packet SENDER subfield as part of the data packet and said receiving transceiver accepting the received SENDER subfield as the identity address of the transmitting transceiver; and
 c. each transceiver, when not in an active transmission or receiving state, being in a scan mode in which it scans and receives information in each communication channel in active use, and records in memory the CHANNEL and the TARGET and SENDER addresses of the transceiver using each channel, thus determining and storing in memory the addresses of each TARGET and SENDER in active communication in each channel, with the scan mode of a transceiver being characterized by the transceiver not transmitting a Wqr signal in response to a data packet.

15. A composite shift key method of communication for binary signals as claimed in claim 14, wherein a transceiver, when instructed to establish a communications link with a target transceiver, using the information stored in memory to ascertain if any channels are free and if the target transceiver is free, and if so, attempting to establish a communications link with the target transceiver by transmitting a data packet thereto and checking for the target transceiver to signal that the binary signal transmission is being successfully received by properly transmitting the second qualifying signal Wqr in response thereto, and if a signal that the binary signal transmission is being successfully received is not received, than the transceiver re-attempting to establish the link a given number of times based on its own unique address, whereby if two transceivers are simultaneously attempting to establish a communications link with the same target transceiver, the resulting interference deadlock is resolved based on a priority system based on the unique addresses of the transceivers.

16. A composite shift key method of communication for binary signals as claimed in claim 1, wherein the transmitting transceiver transmits binary signals in data packets, and decreases the length of successive data packets in response to previous data packet transmissions not being successfully received by the receiving transceiver, to make the data packets shorter to compensate for apparent increased noise on the transmission medium, such that an adaptive packet length is utilized to compensate for noise on the transmission medium.

17. A composite shift key method of communication for binary signals as claimed in claim 16, wherein the transmitting transceiver incrementally increases the length of successive data packets in response to the previous data packets being successfully received by the receiving transceiver.

18. A composite shift key method of communication for binary signals as claimed in claim 17, said transmitting transceiver having a memory with a memory field having therein a maximum effective packet length for transmission, and a minimum packet length to enable transmission, and starting a transmission session with a receiving transceiver at said maximum effective packet length.

19. A composite shift key method of communication for binary signals as claimed in claim 16, wherein:
 a. said transceivers are capable of transmitting and receiving signals over a plurality of different communication channels, each of which has a different frequency band allocation, which channels are also shared by additional similar transceivers; and
 b. each transceiver records in memory information on every other transceiver and each communication channel on the adaptive data packet length of previous transmissions therein, and when the transceiver is setting up a data transmission with another transceiver, it selects that available communication channel which the information in its memory indicates has the longest adaptive data packet length, indicating it is the best channel over which to communicate.

20. A composite shift key method of communication for binary signals as claimed in claim 1, said transceivers being capable of transmitting and receiving signals over a plurality of different communication channels, each of which channels has a different frequency band allocation, which are also shared by additional similar transceivers, and each transceiver maintains a memory having stored therein the history of its transmission record with every other transceiver over each communication channel, and when each transceiver is setting up a data transmission with an other transceiver, it selects that available communication channel, which the information in memory indicates is the best channel over which to communicate with that other receiver.

21. A composite shift key method of communication for binary signals as claimed in claim 1, wherein:
 a. said transceivers are capable of transmitting and receiving signals over a plurality of different communication channels, each of which channels has a different frequency band allocation, which are also shared by additional similar transceivers;

b. each transceiver, when not in an active transmission or receiving mode, being in a scan mode in which it scans and receives information in each communication channel in active use, and records in memory information available on each communication channel, with the scan mode of a transceiver being characterized by the transceiver not transmitting a Wqr signal in response to a binary signal transmission.

22. A method of communication for binary signals, comprising:
   a. transmitting binary signals from a transmitting transceiver having a transmitter and a receiver by transmitting a first signal when a binary one is desired to be transmitted, and transmitting a second signal, recognizably different from said first signal, when a binary zero is desired to be transmitted;
   b. receiving the transmitted signals at a receiving transceiver having a transmitter and a receiver, indentifying a binary one signal when the first signal is received, and identifying a binary zero signal when the second signal is received;
   c. signalling from the receiving transceiver to the transmitting transceiver that the binary signal transmission is being successfullly received, by transmitting from the receiving transceiver a qualifying signal, and dropping the transmission of the qualifying signal when the binary signal transmission is not being successfully received, to signal to the transmitting transceiver that the binary signal transmission is not being successfully received;
   d. said transmitting transceiver receiving the qualifying signal during a binary signal transmission and maintaining its transmission of binary signals when the qualifying signal is received, indicating a successful binary signal transmission, and dropping and restarting transmission of the binary signals in response to the transmission of the qualifying signal being dropped by the receiving transceiver, indicating an unsuccessful binary signal transmission; and
   e. said transmitting transceiver transmitting binary signals in data packets, during the transmission of which it also transmits a qualifying signal, and said transmitting transceiver dropping transmission of its qualifying signal after transmission of a data packet, and said receiving transceiver dropping transmission of its qualifying signal in response to the transmitting transceiver dropping its qualifying signal after transmission of a data packet.

23. A method of communication for binary signals as claimed in claim 22, said transmitting transceiver transmitting a data packet having a subfield at the beginning thereof indicating the expected length of the data packet, and said receiving transceiver timing the dropping of the qualifying signal by the transmitting transceiver after transmission of a data packet to ensure that the dropping is within an expected dropping interval as indicated by said subfield, and if so, the receiving transceiver dropping transmission of its qualifying signal within an expected dropping interval, and said transmitting transceiver timing the dropping by the receiving transceiver of its qualifying signal to ensure that it is within the expected dropping interval, and if so, the transmitting transceiver accepting the dropping of the qualifying signal by the receiving transceiver within the expected dropping interval as a signal that the data packet was successfully received by the receiving transceiver.

24. A composite shift key communication system for binary signals comprising:
   a. a transmitting transceiver which transmits a summed signal having a qualifying signal at a qualifying signal frequency Wqt as one of the summed signal components only when binary data, either a binary zero or a binary one, is desired to be transmitted, said transmitting transceiver transmitting a first summed signal of a first signal at a first frequency with the qualifying signal at the qualifying signal frequency Wqt, when a binary one is desired to be transmitted, and said transmitting transceiver transmitting a second summed signal of a second signal at a second frequency with the qualifying signal at the qualifying signal frequency Wqt, when a binary zero is desired to be transmitted, and said transmitting transceiver ceasing transmission of the qualifying signal at the qualifying signal frequency Wqt as a transmitted signal or as a component of a composite summed signal when neither a binary zero nor a binary one is desired to be transmitted;
   b. a receiving transceiver having a transmitter and a receiver for receiving the transmitted signals, including means for identifying a binary one signal only when the qualifying signal Wqt and the first frequency signal W1 are received simultaneously as the first summed signal, and means for identifying a binary zero signal only when the qualifying signal Wqt and the second frequency signal W0 are received simultaneously as the second summed signal, and said receiving transceiver signalling to the transmitting transceiver when the first qualifying signal Wqt is received simultaneously with the first frequency signal W1 as the first summed signal or when the first qualifying signal Wqt is received simultaneously with the second frequency signal W0 as the second summed signal, that the binary signal transmission is being successfully received, by transmitting a second qualifying signal Wqr, and dropping the transmission of the second qualifying signal Wqr when the first qualifying signal Wqt is not received simultaneously with the first frequency signal W1 as the first summed signal or when the qualifying signal Wqt is not received simultaneously with the second frequency signal W0 as the second summed signal, to signal to the transmitting transceiver that the binary signal transmission is not being successfully received.

25. A composite shift key communication system for binary signals as claimed in claim 24, said transmitting and receiving transceivers being coupled together in a communications link over AC power supply lines to form a local area communications network.

26. A composite shift key communication system for binary signals as claimed in claim 24, said receiving transceiver including an exclusive OR circuit for testing the signals W1 and W0 for a complementary, exclusive OR relationship, and also dropping the transmission of the second qualifying signal Wqr when the exclusive OR circuit detects that the first frequency signal W1 and the second frequency signal W0 are not complementary signals, to signal to the transmitting transceiver that the binary signal transmission is not being successfully received by the receiving transceiver.

27. A composite shift key communication system for binary signals as claimed in claim 24, said transmitting transceiver receiving the second qualifying signal Wqr during a binary signal transmission, and includes means, responsive thereto, for maintaining its transmission of binary signals when Wqr is received, indicating a successful binary signal transmission, and dropping and restarting transmission of the binary signals in response to the transmission of Wqr being dropped by the receiving transceiver, indicating an unsuccessful binary signal transmission.

28. A composite shift key communication system for binary signals as claimed in claim 24, said transmitting transceiver including means for transmitting binary signals in data packets, and dropping transmission of the first qualifying signal Wqt after transmission of a data packet, and said receiving transceiver dropping transmission of the second qualifying signal Wqr in response to a dropping of the first qualifying signal Wqt after transmission of a data packet.

29. A composite shift key communication system for binary signals as claimed in claim 28, said transmitting transceiver including means for transmitting a data packet having a subfield at the beginning thereof indicating the expected length of the data packet, and said receiving transceiver timing the dropping of the first qualifying signal Wqt after transmission of a data packet to ensure that the dropping of Wqt is within an expected Wqt dropping interval as indicated by said subfield, and if so, the receiving transceiver dropping transmission of the second qualifying signal Wqr within an expected Wqr dropping interval, and said transmitting transceiver timing the dropping of Wqr to ensure that the dropping of Wqr is within said expected Wqr dropping interval, and the transmitting transceiver accepting the dropping of Wqr within the expected Wqr dropping interval as a signal that the data packet was successfully received by the receiving transceiver.

30. A system for communication of binary signals, comprising:
  a. a transmitting transceiver having a transmitter and a receiver for transmitting binary signals by transmitting a first signal when a binary one is desired to be transmitted, and transmitting a second signal, recognizably different from said first signal, when a binary zero is desired to be transmitted;
  b. a receiving transceiver having a transmitter and a receiver for receiving the transmitted signals, including means for identifying a binary one signal when the first signal is received, and identifying a binary zero signal when the second signal is received, said receiving transceiver transmitting a qualifying signal to the transmitting transceiver when the binary signal transmission is being successfully received and dropping the transmission of the qualifying signal when the binary signal transmission is not being successfully received, to signal to the transmitting transceiver that the binary signal transmission is not being successfully received; and
  c. said transmitting transceiver receiving the qualifying signal during a binary signal transmission, and including means for maintaining its transmission of binary signals when the qualifying signal is received, indicating a sucessful binary signal transmission, and dropping and restarting transmission of the binary signals in response to the transmission of the qualifying signal being dropped by the receiving transceiver, indicating an unsuccessful binary signal transmission; and
  d. said transmitting transceiver including means for transmitting binary signals in data packets, during the transmission of which it also transmits a qualifying signal, and said transmitting transceiver dropping transmission of its qualifying signal after transmission of a data packet, and said receiving transceiver including means for dropping transmission of its qualifying signal in response to the transmitting transceiver dropping its qualifying signal after transmission of a data packet.

31. A system for communication of binary signals as claimed in claim 30, said transmitting transceiver including means for transmitting a data packet having a subfield at the beginning thereof indicating the expected length of the data packet, and said receiving transceiver including means for timing the dropping of the qualifying signal by the transmitting transceiver after transmission of a data packet to ensure that the dropping is within an expected dropping interval as indicated by said subfield, and if so, the receiving transceiver dropping transmission of its qualifying signal within an expected dropping interval, and said transmitting transceiver including means for timing the dropping by the receiving transceiver of its qualifying signal to ensure that it is within the expected dropping interval, and if so, the transmitting transceiver accepting the dropping of the qualifying signal by the receiving transceiver within the expected dropping interval as a signal that the data packet was successfully received by the receiving transceiver.

* * * * *